(12) United States Patent
Matsumoto

(10) Patent No.: US 8,775,173 B2
(45) Date of Patent: Jul. 8, 2014

(54) ERRONEOUS DETECTION DETERMINATION DEVICE, ERRONEOUS DETECTION DETERMINATION METHOD, AND STORAGE MEDIUM STORING ERRONEOUS DETECTION DETERMINATION PROGRAM

(75) Inventor: Chikako Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 13/406,935

(22) Filed: Feb. 28, 2012

(65) Prior Publication Data

US 2012/0239394 A1    Sep. 20, 2012

(30) Foreign Application Priority Data

Mar. 18, 2011    (JP) .................................. 2011-060796

(51) Int. Cl.
*G10L 15/00*    (2013.01)
*G10L 25/84*    (2013.01)
(52) U.S. Cl.
CPC ...................................... *G10L 25/84* (2013.01)
USPC .......................................... 704/233; 704/253
(58) Field of Classification Search
CPC ....................................................... G10L 25/84
See application file for complete search history.

(56) References Cited

U.S. PATENT DOCUMENTS

| | | | |
|---|---|---|---|
| 5,740,318 A * | 4/1998 | Naito et al. ..................... 704/253 |
| 6,707,910 B1 * | 3/2004 | Valve et al. ............... 379/388.06 |
| 7,941,315 B2 | 5/2011 | Matsuo | |
| 8,005,238 B2 * | 8/2011 | Tashev et al. ................. 381/94.2 |
| 8,321,213 B2 * | 11/2012 | Petit et al. ..................... 704/208 |
| 8,620,672 B2 * | 12/2013 | Visser et al. .................. 704/500 |
| 2008/0069364 A1 | 3/2008 | Itou et al. | |
| 2008/0095384 A1 * | 4/2008 | Son et al. ..................... 381/94.1 |

(Continued)

FOREIGN PATENT DOCUMENTS

| | | |
|---|---|---|
| JP | 10-097269 | 4/1998 |
| JP | 2007-183306 | 7/2007 |
| JP | 2008-76676 | 4/2008 |
| JP | 2010-124370 | 6/2010 |

OTHER PUBLICATIONS

Yoon, Byung-Jun, Ivan Tashev, and Alex Acero. "Robust adaptive beamforming algorithm using instantaneous direction of arrival with enhanced noise suppression capability." Acoustics, Speech and Signal Processing, 2007. ICASSP 2007. IEEE International Conference on. vol. 1. IEEE, 2007.*

(Continued)

*Primary Examiner* — Brian Albertalli
(74) *Attorney, Agent, or Firm* — Staas & Halsey LLP

(57) ABSTRACT

An erroneous detection determination device includes: a signal acquisition unit configured to acquire, from each of microphones, a plurality of audio signals relating to ambient sound including sound from a sound source in a certain direction; a result acquisition unit configured to acquire a recognition result including voice activity information indicating the inclusion of a voice activity relating to at least one of the audio signals; a calculation unit configured to calculate, for each of audio signals on the basis of the signals in respective unit times and the certain direction, a speech arrival rate representing the proportion of the sound from the certain direction to the ambient sound in each of the unit times; and an error detection unit configured to determine, on the basis of the recognition result and the speech arrival rate, whether or not the voice activity information is the result of erroneous detection.

20 Claims, 18 Drawing Sheets

(56) References Cited

U.S. PATENT DOCUMENTS

2008/0181058 A1* 7/2008 Hayakawa .................... 367/125
2009/0299742 A1* 12/2009 Toman et al. ................. 704/233
2010/0128895 A1   5/2010 Matsuo
2011/0131044 A1* 6/2011 Fukuda et al. ................ 704/246
2012/0310641 A1* 12/2012 Niemist et al. ................ 704/233

OTHER PUBLICATIONS

Fujitsu, vol. 49, No. 1, "Speech Input Interface with Microphone Array" Naoshi Matsuo, pp. 80-84, 1998.

* cited by examiner

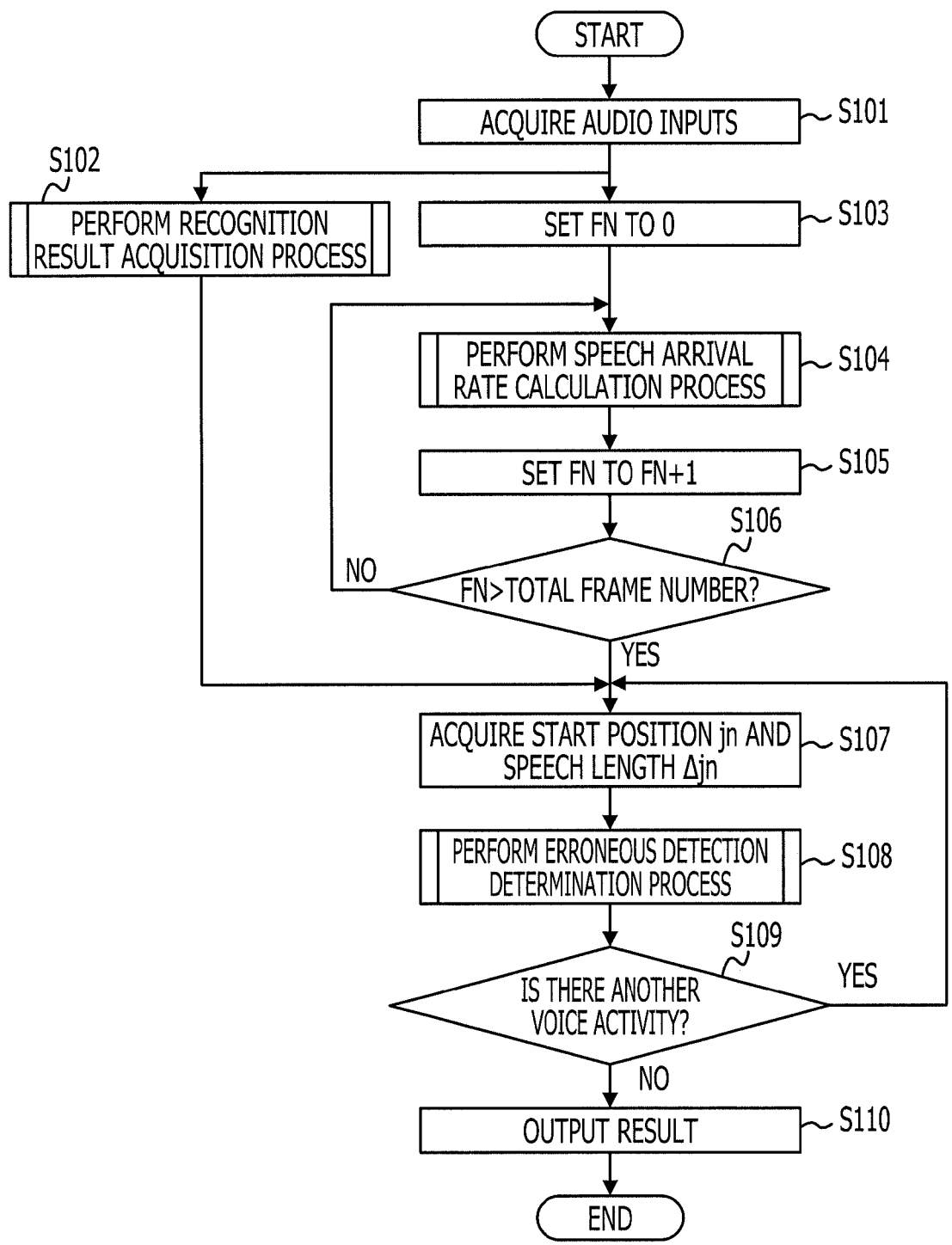

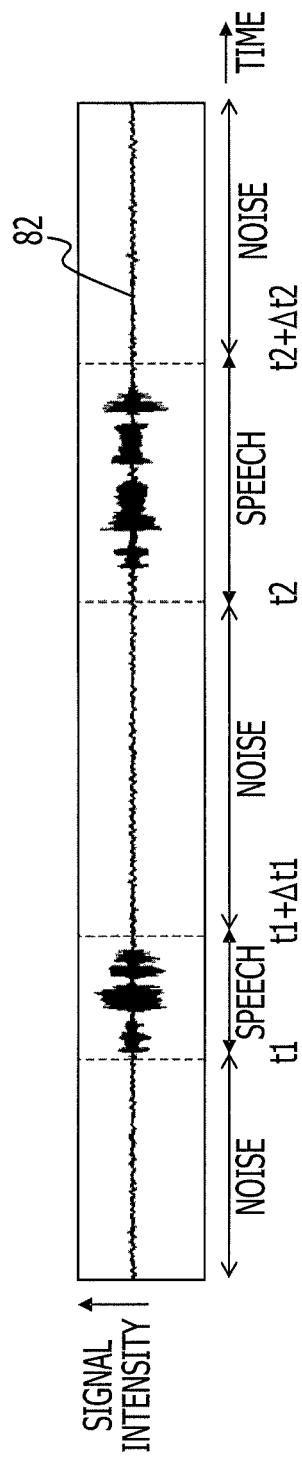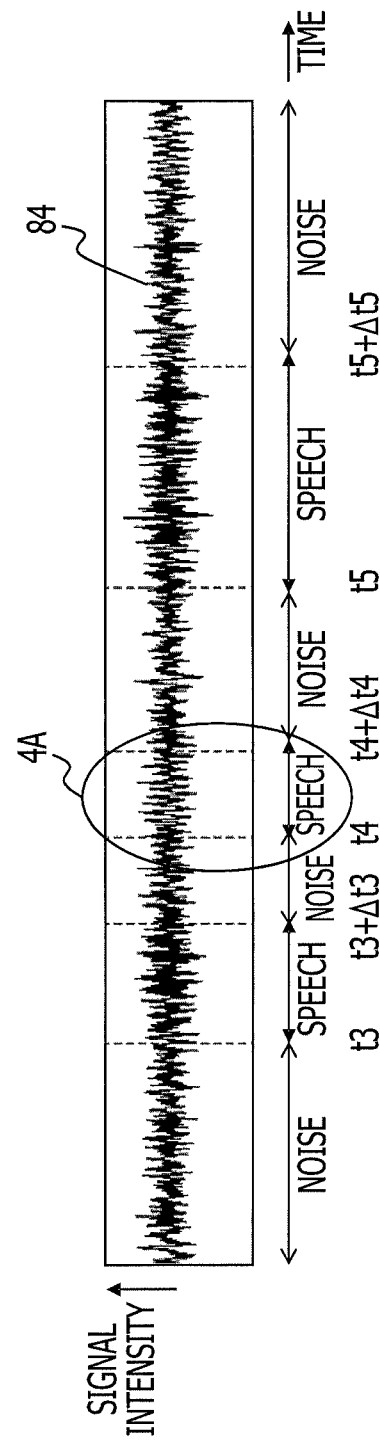

ERRONEOUS DETECTION DETERMINATION DEVICE, ERRONEOUS DETECTION DETERMINATION METHOD, AND STORAGE MEDIUM STORING ERRONEOUS DETECTION DETERMINATION PROGRAM

CROSS-REFERENCE TO RELATED APPLICATION

This application is based upon and claims the benefit of priority of the prior Japanese Patent Application No. 2011-60796, filed on Mar. 18, 2011, the entire contents of which are incorporated herein by reference.

FIELD

The techniques disclosed in the embodiments are related to an erroneous detection determination device, an erroneous detection determination method, and a storage medium storing an erroneous detection determination program, which are related to speech.

BACKGROUND

Along with the development of computer technology, the recognition accuracy of speech recognition has rapidly been improving. In an in-vehicle car navigation system, a television conference system, a digital signage system, or the like equipped with speech recognition technology, an "out-of-context" error of erroneously detecting a noise as a speech occurs in a noisy environment. A technique is therefore desired which suppresses the out-of-context error in an environment with many noises.

For example, as a technique of performing highly noise-resistant speech detection independent of the number of phonemes in an audio signal, there is an example using an acoustic feature quantity of an input signal. The method is a technique of comparing an extracted acoustic feature quantity with a previously stored acoustic feature quantity of a noise signal, and determining the input signal as noise if the acoustic feature quantity of the input signal is close to the stored acoustic feature quantity of the noise signal.

According to another technique, sound signals in frame units of sound data are converted into a spectrum, and a spectrum envelope is calculated from the spectrum. There is also an example of audio signal processing of suppressing a detected peak in the spectrum having the spectrum envelope removed therefrom. With the removal of the spectrum envelope, a sharp peak with a narrow bandwidth in non-stationary noise, such as electronic sound and siren sound, is detected and suppressed even in an environment in which stationary noise having a gentle peak with a wide bandwidth, such as engine sound and air conditioner sound, is generated. Further, there is an example of determining the arrival direction of sound with the use of audio signals obtained by a plurality of microphones on the basis of the correlation between the signals from the microphones, and suppressing sounds other than the sound arriving from the direction of a speaking person. Furthermore, there is an example of calculating a noise reduction coefficient for reducing noise on the basis of an audio signal, and reducing noise in the audio signal on the basis of the noise reduction coefficient and the original audio signal. The above-described related-art techniques are disclosed in, for example, Japanese Laid-open Patent Publication Nos. 10-97269, 2008-76676, 2010-124370, and 2007-183306, and Matsuo Naoshi et al., "Speech Input Interface with Microphone Array," *FUJITSU*, Vol. 49, No. 1, pages 80 to 84, January 1998.

SUMMARY

According to an aspect of the invention, an erroneous detection determination device includes: a signal acquisition unit configured to acquire, from each of a plurality of microphones, a plurality of audio signals relating to ambient sound including sound from a sound source in a certain direction; a result acquisition unit configured to acquire a recognition result including voice activity information indicating the inclusion of a voice activity relating to at least one of the plurality of audio signals; a calculation unit configured to calculate, on the basis of the signal of respective unit time of the plurality of audio signals and the certain direction, a speech arrival rate representing the proportion of the sound from the certain direction to the ambient sound in each of the unit times; and an error detection unit configured to determine, on the basis of the recognition result and the speech arrival rate, whether or not the speech information is the result of erroneous detection.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart illustrating major operations of the erroneous speech detection determination system according to the first embodiment;

FIG. 4A is a diagram illustrating an example of a waveform of an input signal having a high SNR, and FIG. 4B is a diagram illustrating an example of a waveform of an input signal having a low SNR;

DESCRIPTION OF EMBODIMENTS

For example, related-art techniques attain high determination accuracy in an environment with a high signal-to-noise ratio, but occasionally cause erroneous determination in a highly noisy environment with a low signal-to-noise ratio. A method using a spectrum having a spectrum envelope removed therefrom is effective against non-stationary noise having a sharp peak in a specific band, but is not effective against voices of other people and wideband non-stationary noise. A method including an acoustic model learning process previously learns noise, and thus is capable of properly learning stationary noise. The method, however, has difficulty in learning non-stationary noise, and thus erroneously recognizes noise as speech in some cases. Further, an example of suppressing sounds other than the sound arriving from the direction of a speaking person performs voice activity detection as preprocessing of speech recognition. Audio data subjected to the preprocessing, therefore, suddenly moves from a noise-suppressed segment to a noise-mixed voice activity, and causes an issue of degrading of the speech recognition rate.

In view of the above, the techniques disclosed in the embodiments address suppression, in speech recognition, of erroneous detection of a noise segment other than a recognition target speech as the recognition target speech even in a variety of noise environments, such as a highly noisy environment with non-stationary noise.

First Embodiment

Figure 1:
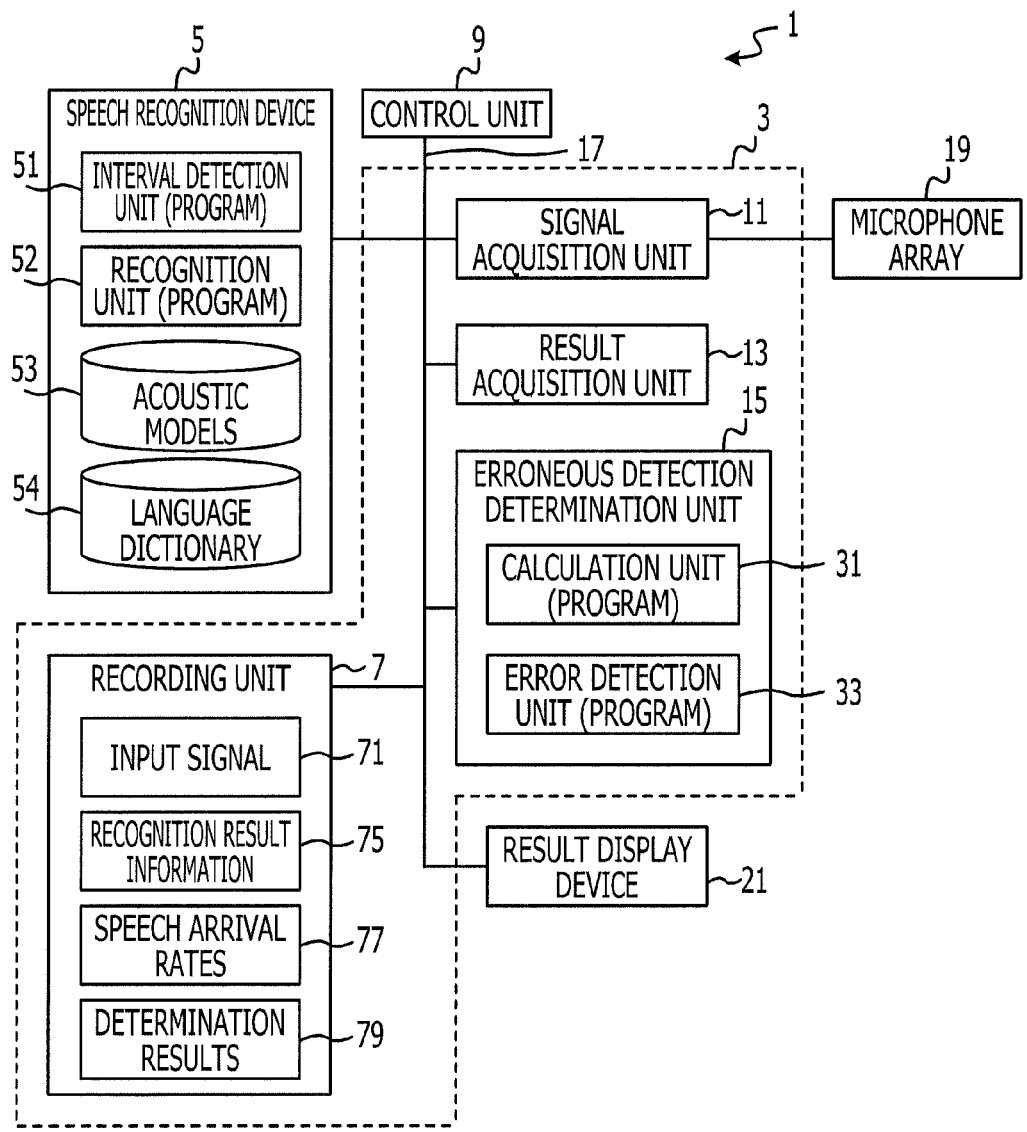
FIG. 1 is a block diagram illustrating a configuration of an erroneous speech detection determination system according to a first embodiment.
Figure 2:
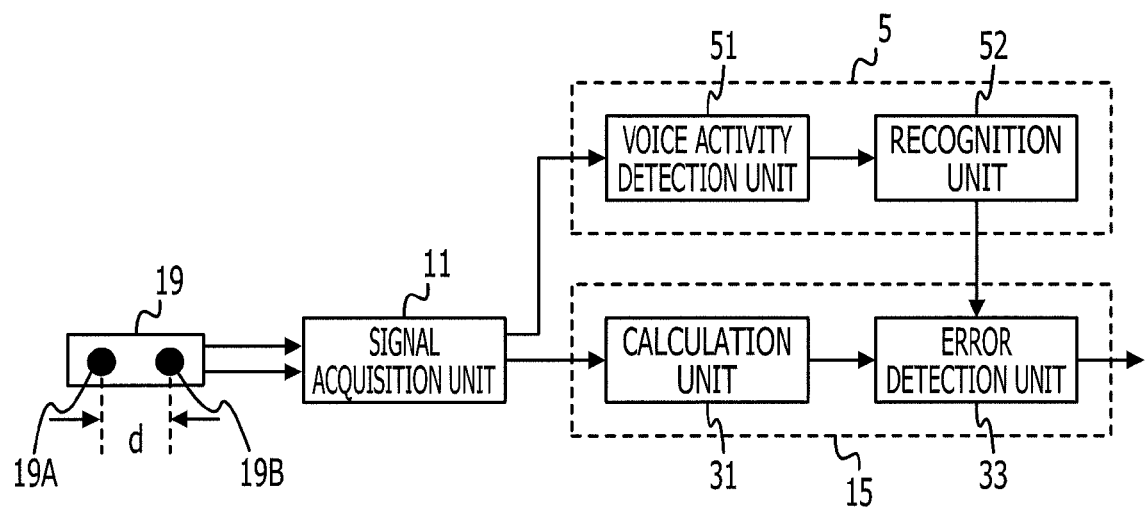
FIG. 2 is a block diagram illustrating functions of the erroneous speech detection determination system according to the first embodiment.

With reference to FIGS. 1 to 10, an erroneous speech detection determination system according to a first embodiment will be described below. With reference to FIGS. 1 and 2, a configuration and functions of an erroneous speech detection determination system 1 will be first described. FIG. 1 is a block diagram illustrating a configuration of the erroneous speech detection determination system 1 according to the first embodiment. FIG. 2 is a block diagram illustrating functions of the erroneous speech detection determination system 1 according to the first embodiment.

As illustrated in FIG. 1, the erroneous speech detection determination system 1 includes an erroneous detection determination device 3, a speech recognition device 5, a control unit 9, and a result display device 21, which are connected to one another by a system bus 17. According to the erroneous speech detection determination system 1, the erroneous detection determination device 3 determines erroneous detection of a voice activity detected by the speech recognition device 5, and the result display device 21 outputs a recognition result reflecting the determination result.

The speech recognition device 5 includes a voice activity detection unit 51 and a recognition unit 52, and further includes, for example, acoustic models 53 and a language dictionary 55 as reference information for speech recognition. The acoustic models 53 are information representing frequency characteristics of respective recognition target phonemes. The language dictionary 55 is information recording grammar and recognizable vocabulary described in phonemic or syllabic definitions corresponding to the acoustic models 53.

The erroneous detection determination device 3 includes a signal acquisition unit 11, a result acquisition unit 13, an erroneous detection determination unit 15, and a recording unit 7. The erroneous detection determination unit 15 includes a calculation unit 31 and an error detection unit 33. The recording unit 7, which is a memory such as a random access memory (RAM), for example, stores input signals 71, recognition result information 75, speech arrival rates 77, and determination results 79.

The input signals 71 include sound from a certain sound source acquired via the signal acquisition unit 11. The recognition result information 75 represents the results of recognition by the speech recognition device 5. The speech arrival rates 77 are information representing speech arrival rates in respective certain times calculated by the calculation unit 31. The determination results 79 are information representing determination results each taking account of a recognition result recognized by the speech recognition device 5 and an erroneous detection determination result determined by the erroneous detection determination device 3. Further, the signal acquisition unit 11 is connected to a microphone array 19.

As illustrated in FIG. 2, the microphone array 19 includes microphones A and B disposed as spaced from each other by a distance d. The distance d is set to any distance which does not cause a substantial difference between the respective sounds picked up by the two microphones A and B, and which allows the measurement of the phase difference. Further, the microphone array 19 picks up ambient sound including the sound from a sound source, such as a speaking person or a speaker device, for example, disposed in a certain direction relative to the microphone array 19.

As illustrated in FIGS. 1 and 2, the signal acquisition unit 11 of the erroneous detection determination device 3 acquires respective analog input signals converted from the respective sounds picked up by the microphones A and B. On the basis of at least one of the input signals acquired by the signal acquisition unit 11, the voice activity detection unit 51 detects a voice activity including speech, and outputs a start position jn and a speech length Δjn of the voice activity. The detection of the voice activity may be performed by the use of any related-art method.

For example, a method may be employed which determines the voice activity as an segment in which the signal-to-noise ratio (SNR) of the acquired audio signal is equal to or greater than a certain threshold value. Further, a method may be employed which converts the acquired input signal into a spectrum in frame units each corresponding to a segment of a certain time, and which detects the voice activity on the basis of a feature quantity extracted from the converted spectrum. The method extracts the power and pitch of the converted spectrum as the feature quantity, detects, on the basis of the power and pitch, frames having a value equal to or greater than a threshold value for voice activity detection, and determines an activity as a voice activity if the detected frames continuously appear for a certain time or longer.

On the basis of the voice activity detected as described above, the recognition unit 52 performs speech recognition by referring to the acoustic models 53 and the language dictionary 55. For example, the recognition unit 52 calculates the degree of similarity on the basis of the information in the acoustic models 53 and the waveform of the detected voice activity, and refers to language information relating to the recognizable vocabulary in the language dictionary 55, to thereby detect a character string ca corresponding to the voice activity. The speech recognition device 5 outputs the result of speech recognition, e.g., the start position jn, the speech length Δjn, and the character string ca of the voice activity, as recognition result information. The start position jn and the speech length Δjn are represented as the frame number and the frame length, the start time and the duration of the voice activity, or the sample number and the number of samples, respectively.

The result acquisition unit 13 acquires from the recording unit 7 the recognition result information output by the speech recognition device 5. The calculation unit 31 of the erroneous detection determination unit 15 acquires from the recording unit 7 input signals 71A and 71B based on the sounds picked up by the microphone array 19, and calculates, for each of the frames of the certain time, the proportion of the sound from the certain direction, in which the sound source is disposed, to all sounds as the speech arrival rate. The error detection unit 33 detects a recognition error in voice activity on the basis of the speech arrival rate calculated by the calculation unit 31 and the recognition result information output by the speech recognition device 5. The control unit 9 is an arithmetic processing device which controls the overall operation of the erroneous speech detection determination system 1.

With reference to FIGS. 3 to 10, description will be made of operations of the erroneous speech detection determination system 1 according to the first embodiment configured as described above. FIG. 3 is a flowchart illustrating major operations of the erroneous speech detection determination system 1. As illustrated in FIG. 3, the erroneous speech detection determination system 1 acquires, via the signal acquisition unit 11, two analog input signals from the sounds picked up by the microphones A and B of the microphone array 19 (Operation S101). In this process, the control unit 9 samples the acquired two analog input signals at a certain sampling frequency fs, and stores the sampled input signals in the recording unit 7 as the input signals 71A and 71B.

FIG. 4A is a diagram illustrating an example of a waveform of an input signal having a high SNR, and FIG. 4B is a diagram illustrating an example of a waveform of an input signal having a low SNR. In FIGS. 4A and 4B, the horizontal axis represents the time, and the vertical axis represents the signal intensity. If the input signal acquired by the signal acquisition unit 11 is high in SNR, the input signal has a waveform including speech portions with large fluctuations and noise portions with low signal intensity, as in an input signal 82. If the input signal is low in SNR, the input signal has a waveform including noise and speech difficult to distinguish from each other, as in an input signal 84.

Figure 5:
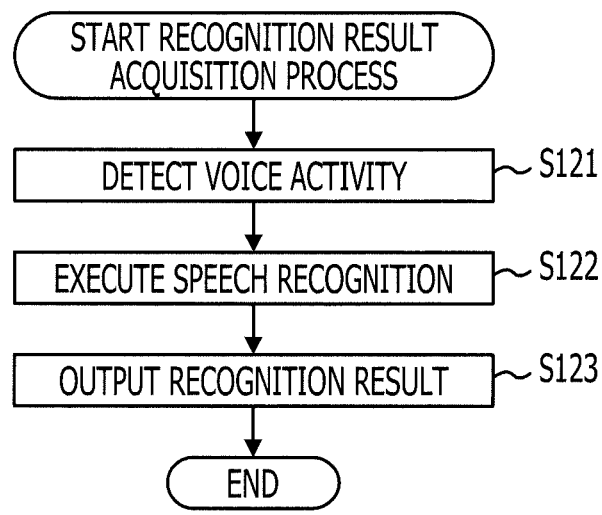
FIG. 5 is a flowchart illustrating a recognition result acquisition process according to the first embodiment.

Returning to FIG. 3, after Operation S101, a recognition result acquisition process and a speech arrival rate calculation process are performed in parallel. The recognition result acquisition process (Operation S102) will be first described. FIG. 5 is a flowchart illustrating the recognition result acquisition process. As illustrated in FIG. 5, the voice activity detection unit 51 detects the voice activity by using a related-art method, as described above (Operation S121).

For example, the waveforms of FIGS. 4A and 4B will now be described as examples. The voice activity detection unit 51 detects the voice activity between times t1 and t1+Δt1 and the interval between times t2 and t2+Δt2 as voice activities in the input signal 82. The voice activity detection unit 51 further detects the interval between times t3 and t3+Δt3, the interval between times t4 and t4+Δt4, and the interval between times t5 and t5+Δt5 as voice activities in the input signal 84. In the example of FIG. 4B, the interval between the times t4 and t4+Δt4 (region 4A) is determined as a voice activity. This determination is an example of erroneous detection. In this process, at least one of the input signals 71A and 71B is used as the input signal.

The recognition unit 52 performs speech recognition on the detected voice activity by referring to the acoustic models 53 and the language dictionary 55, as described above (Operation S122). The speech recognition device 5 outputs the start position jn, the voice activity length Δjn, and the character string ca of the detected voice activity as the recognition result information (Operation S123). For example, the start position jn, the voice activity length Δjn, and the character string ca may be t1, Δt1, and "weather forecast," respectively. The control unit 9 stores the recognition result information in the recording unit 7.

Returning to FIG. 3, the speech arrival rate calculation process will now be described. In a frame in which the sound from the sound source is input to a microphone, many of the frequencies included in the input signal are assumed to indicate the same arrival direction. Further, in a frame in which sounds other than the sound from the sound source are input to a microphone, the frequencies included in the input signal are assumed to have arrived from different arrival directions or from the same direction different from the direction of the sound source. The speech arrival rate calculation process, therefore, determines whether or not a sound is the sound from the sound source on the basis of the speech arrival rate.

The speech arrival rate calculation process according to the first embodiment is performed with each of the input signals 71A and 71B divided into the frames of the certain time. Therefore, the control unit 9 first sets a frame number FN to 0 (Operation S103), and performs the speech arrival rate calculation process (Operation S104). Herein, the frame number FN represents the number according to the temporal order of the frames.

Figure 6:
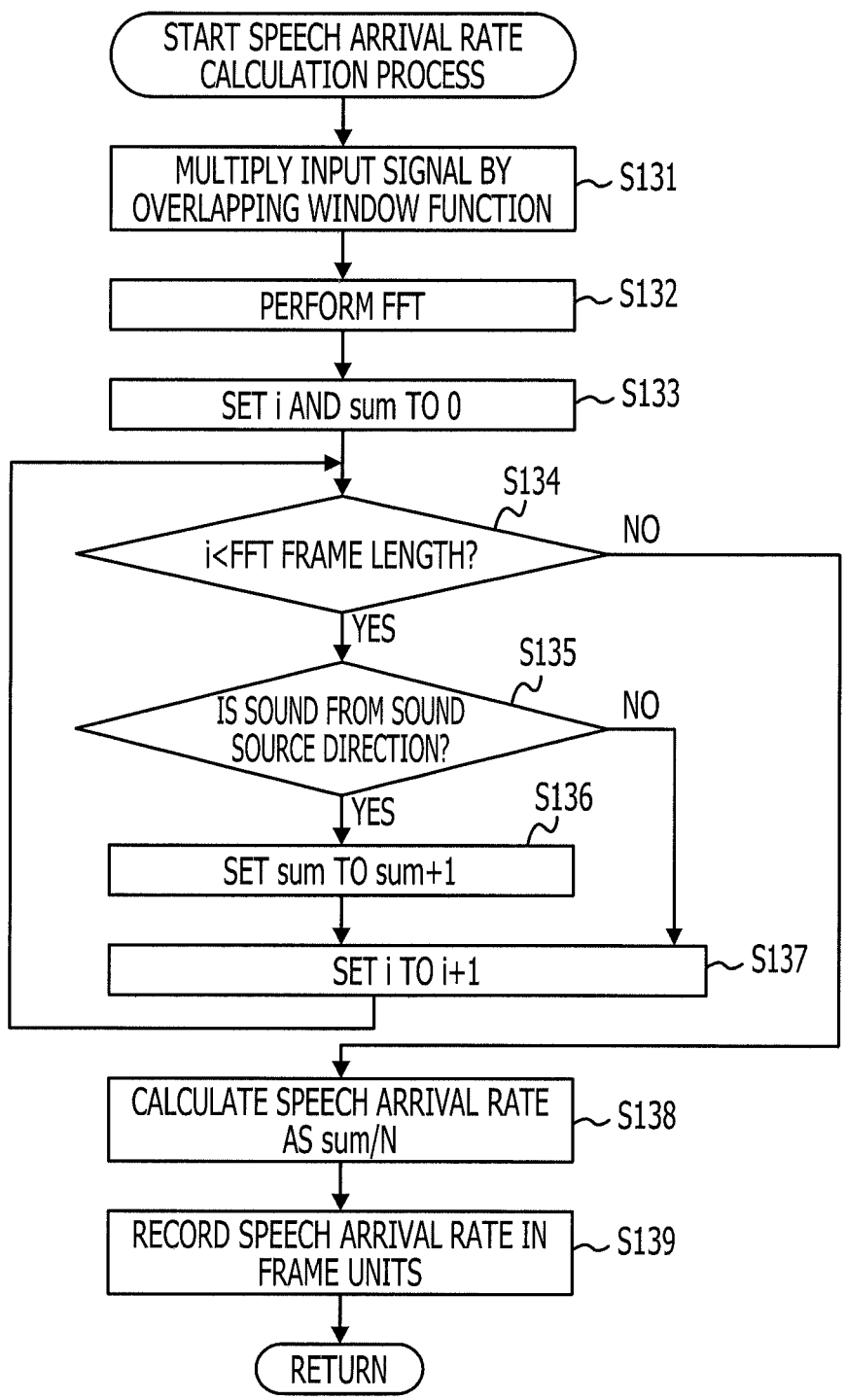
FIG. 6 is a flowchart illustrating a speech arrival rate calculation process according to the first embodiment.

FIG. 6 is a flowchart illustrating the speech arrival rate calculation process of Operation S104. As illustrated in FIG. 6, the calculation unit 31 reads from the recording unit 7 the respective input signals 71A and 71B obtained by the microphones A and B, and multiplies each of the input signals 71A and 71B by an overlapping window function (Operation S131). A Hamming window function, a Hanning window function, a Blackman window function, a three Sigma Gauss window function, or a triangular window function, for example, may be used as the overlapping window function. With Operation S131, signal sequences having, for example, a start time corresponding to a time t0 and a frame length N (the number of samples in a frame) corresponding to the certain time are extracted as frames from the input signals 71A and 71B. Herein, the voice activity between temporally adjacent frames is set as, for example, a frame interval T.

Subsequently, the calculation unit 31 performs fast Fourier transform (FFT) on the frame corresponding to a frame number FN of 0 to generate a spectrum in the frequency domain (Operation S132). That is, when respective audio signal sequences of the input signals 71A and 71B each including samples corresponding to the length of one frame are represented as signals INA(t) and INB(t), amplitude spectra INAAMP(f) and INBAMP(f) and phase spectra INAθ(f) and INBθ(f) as spectral sequences of the frequency f are generated. A value represented as $2^n$ (n is a natural number), such as 128 and 256, may be employed as the frame length N. The determination of whether or not a sound is the sound from the sound source direction is performed for each frequency spectrum in all frequency bands. Herein, the serial number of a frequency f is represented as a variable i (i is an integer), and the frequency corresponding to the variable i is represented as a frequency fi. A speech arrival rate SC in this case represents the proportion of the number of frequencies having an arrival direction determined as the certain direction to the number of all frequencies fi (i ranges from 0 to N−1) in one frame.

The calculation unit 31 sets the variable i and an arrival number sum to 0 (Operation S133). The arrival number sum is a variable for adding up the number of frequencies determined as the sound from the sound source direction, and is represented as an integer. The calculation unit 31 determines whether or not the relationship: variable i>FFT frame length holds (Operation S134). Herein, the FFT frame length corresponds to the frame length N. Then, the calculation unit 31 determines whether or not the arrival direction of the sound corresponds to the direction of the sound source (Operation S135).

Figure 7:
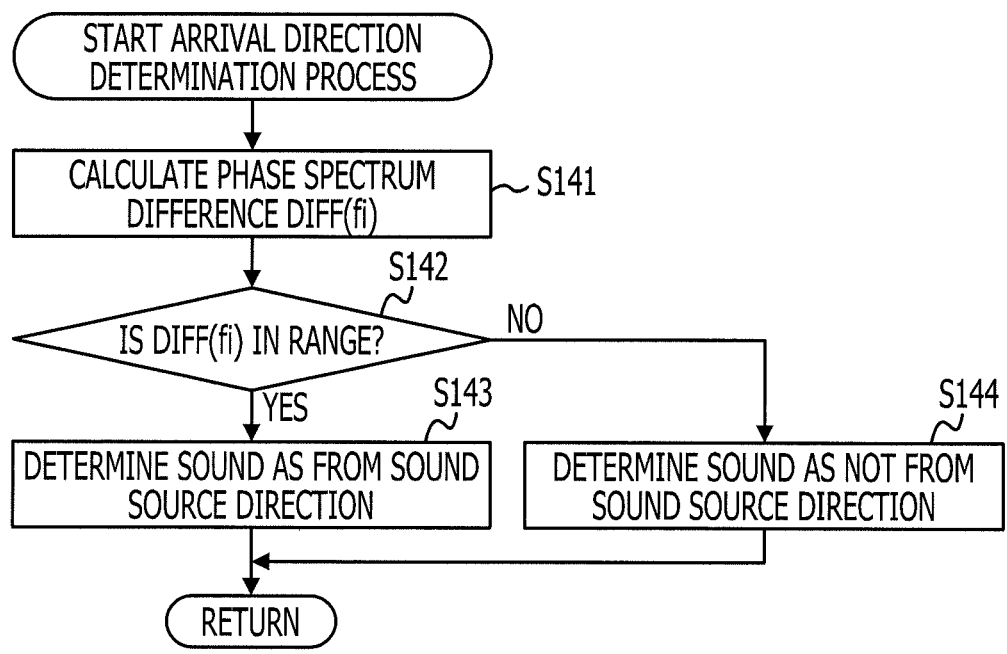
FIG. 7 is a flowchart illustrating an arrival direction determination process according to the first embodiment.

FIG. 7 is a flowchart illustrating the arrival direction determination process. The calculation unit 31 calculates a phase spectrum difference DIFF(fi) on the basis of the phase spectra INAθ(f) and INBθ(f) (Operation S141). That is, the following formula (1) is used.

$$DIFF(fi)=INA\theta(fi)-INB\theta(fi) \tag{1}$$

To determine whether or not the spectra INAθ(fi) and INBθ(fi) correspond to the sound from the certain sound source direction, the calculation unit 31 then determines whether or not the phase spectrum difference DIFF(fi) is in a certain range (Operation S142).

Figure 8:
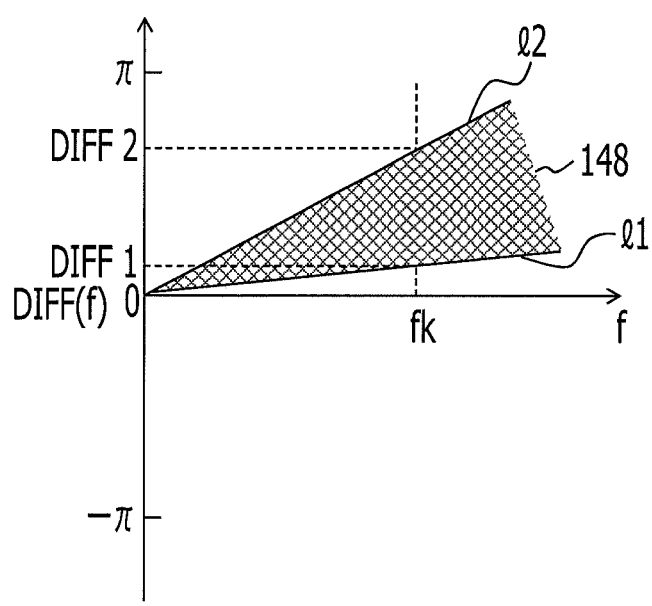
FIG. 8 is a diagram illustrating an example of the acceptable range of a phase spectrum difference with respect to the frequency according to the first embodiment.

FIG. 8 is a diagram illustrating an example of the acceptable range of the phase spectrum difference DIFF(f) for determining a sound as the sound from the sound source direction, as illustrated relative to the frequency f. In FIG. 8, the horizontal axis represents the frequency f, and the vertical axis represents the phase spectrum difference DIFF(f). In the present embodiment, the direction of the sound source is previously determined and stored in, for example, the recording unit 7. If the direction of the sound source corresponds to the certain direction, the value of the phase spectrum difference DIFF(f) is ideally proportional to the frequency f. The detected phase spectrum difference DIFF(f), however, includes an error, depending on, for example, the environment in which the microphone array 19 is disposed and the state of use of the speech recognition. Further, the sound source may be specified not as a point but as an area.

Therefore, the acceptable range of the phase spectrum difference DIFF(f) may be determined by, for example, the following method. That is, as illustrated in FIG. 8, a range satisfying the relationship: DIFF1<phase spectrum difference DIFF(fk)<DIFF2 at the frequency f=fk (fk is one of f0 to fn) is determined as an acceptable range serving as a reference. Then, the range sandwiched by two straight lines l1 and l2 of the phase spectrum difference DIFF(f)=af (a is a coefficient) respectively passing the lower and upper limits of the acceptable range as a reference is determined as the acceptable range of the phase spectrum difference DIFF(f) according to the frequency f. FIG. 8 illustrates an example of the thus determined acceptable range. In the example of FIG. 8, the acceptable range is expressed as an area 148 between the straight lines l1 and l2.

Returning to FIG. 7, if the phase spectrum difference DIFF(fi) at the frequency fi corresponding to the variable i is included in the area 148 between the straight lines l1 and l2 (YES at Operation S142), the calculation unit 31 determines that the sound at the frequency fi is the sound from the sound source direction (Operation S143). If the phase spectrum difference DIFF(fi) is not included in the area 148 between the straight lines l1 and l2 (NO at Operation S142), the calculation unit 31 determines that the sound at the frequency fi is not the sound from the sound source direction (Operation S144). The process returns to Operation S135 of FIG. 6.

If it is determined in FIG. 7 that the sound at the frequency fi is the sound from the sound source direction (YES at Operation S135), the process of FIG. 6 proceeds to Operation S136. At Operation S136, the calculation unit 31 sets the arrival number sum to sum+1, and proceeds to Operation S137. If it is determined in FIG. 7 that the sound at the frequency fi is not the sound from the sound source direction (NO at Operation S135), the process of FIG. 6 directly proceeds to Operation S137. At Operation S137, the calculation unit 31 sets the variable i to i+1, and returns to Operation S134.

The above-described processes of Operations S134 to S137 are repeated while the relationship: variable i<FFT frame length (frame length N) holds (YES at Operation S134). If the variable i reaches the frame length N (NO at Operation S134), the process proceeds to Operation S138. The calculation unit 31 calculates the speech arrival rate SC as sum/N (Operation S138), and records the speech arrival rate SC and the frame number FN in the recording unit 7 (Operation S139). Then, the process returns to Operation S104 of FIG. 3.

Returning to the process of FIG. 3, the control unit 9 sets the frame number FN to FN+1 (Operation S105), and determines whether or not the frame number FN is greater than a total frame number FNA (Operation S106). The total frame number FNA is calculated on the basis of the duration, the frame length N, and the frame interval T of the input signals 71A and 71B. If the frame number FN is not greater than the total frame number FNA (NO at Operation S106), the process returns to Operation S104, and the processes of Operations S104 to S106 are repeated until the calculation of the speech arrival rates SC for all of the frames is completed. If the frame number FN is greater than the total frame number FNA (YES at Operation S106), the process proceeds to Operation S107.

The control unit 9 acquires the start position jn and the voice activity length Δjn from the recognition result information 75 of the recording unit 7 (Operation S107). Herein, if the recorded start position jn and voice activity length Δjn are represented by the time or the sample number, the start position jn and the voice activity length Δjn are converted to be represented by the frame number FN and the frame length N. Subsequently, the error detection unit 33 performs an erroneous speech detection determination process (Operation S108).

Figure 9:
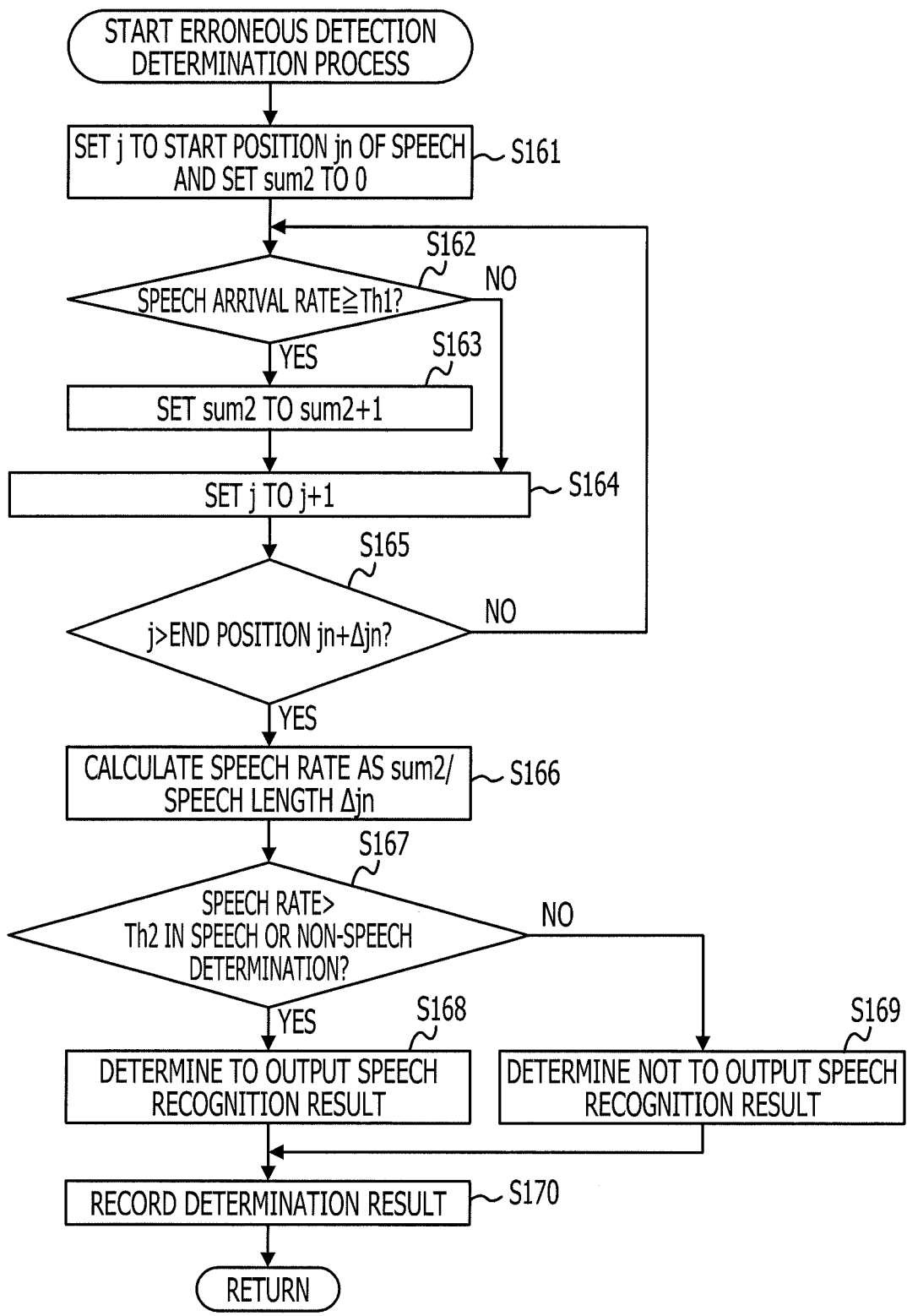
FIG. 9 is a flowchart illustrating an erroneous speech detection determination process according to the first embodiment.
Figure 10:
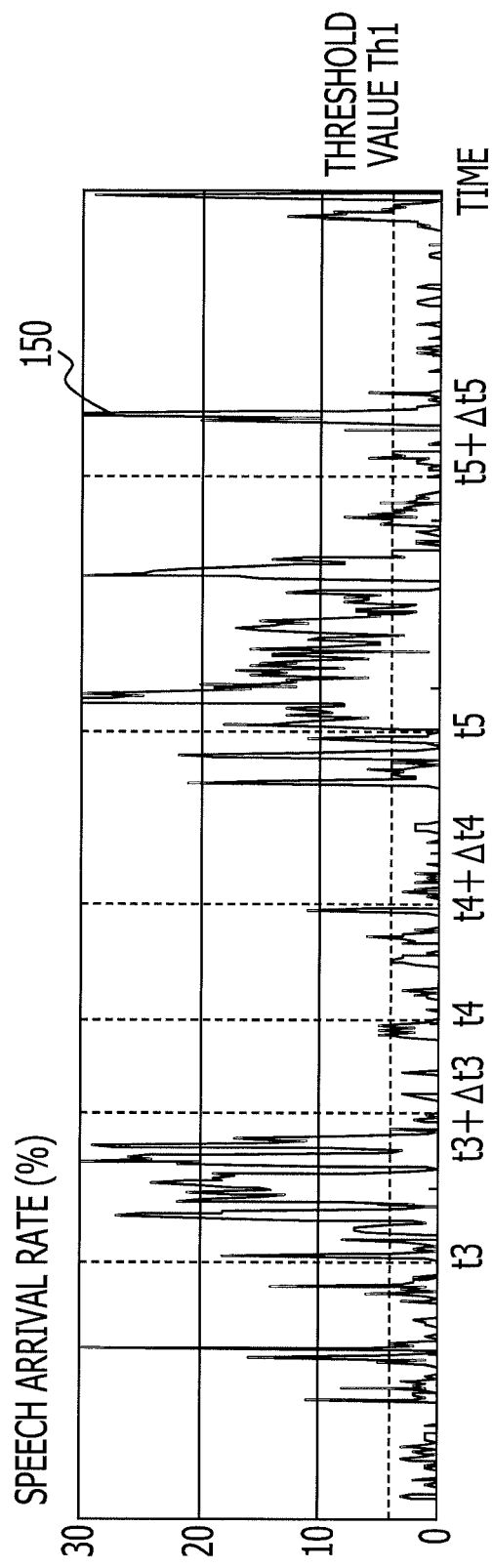
FIG. 10 is a diagram illustrating a change in speech arrival rate according to the first embodiment.

FIG. 9 is a flowchart illustrating the erroneous speech detection determination process. FIG. 10 is a diagram illustrating a change in the speech arrival rate SC. When performing the erroneous speech detection determination process, the error detection unit 33 acquires the recognition result information from the speech recognition device 5 and the speech arrival rate SC from the calculation unit 31. Herein, the recognition result information includes the start position jn, the voice activity length Δjn, and the character string ca. The character string ca is output as the recognition result recognized at the speech recognition device 5.

As illustrated in FIG. 9, the error detection unit 33 sets an voice activity variable j to the start position jn, and sets a speech rate number sum2 to 0 (Operation S161). The voice activity variable j represents the position of the detection target frame. The speech rate number sum2 is a variable for counting the number of frames having a speech arrival rate SC equal to or greater than a threshold value Th1.

In FIG. 10, the vertical axis represents the speech arrival rate SC, and the horizontal axis represents the time corresponding to the time on the horizontal axis of FIG. 4B. FIG. 10 illustrates an example of speech arrival rates SC for all of the frames in the input signal 84 of FIG. 4B, as illustrated relative to the time. As illustrated in a speech arrival rate change 150 of FIG. 10, the value of the speech arrival rate SC is relatively high in the interval between the times t3 and t3+Δt3 and the interval between the times t5 and t5+Δt5 detected as voice activities in FIG. 4B, and is relatively low in the rest of the time including the erroneously detected interval between the times t4 and t4+Δt4.

The error detection unit 33 first reads from the recording unit 7 the speech arrival rate SC of the frame corresponding to the start position jn, and determines whether or not the speech arrival rate SC is equal to or greater than the threshold value Th1 (Operation S162). Herein, the threshold value Th1 may be set to 3.2%, for example. If the speech arrival rate SC is equal to or greater than the threshold value Th1, the error detection unit 33 sets the speech rate number sum2 to sum2+1 (Operation S163), sets the voice activity variable j to j+1 (Operation S164), and proceeds to Operation S165. If the speech arrival rate SC is less than the threshold value Th1, the error detection unit 33 directly proceeds to Operation S164.

The error detection unit 33 repeats the processes of Operations S162 to S165 until the voice activity variable j exceeds the value of a voice activity end position jn+Δjn (NO at Operation S165). If the error detection unit 33 determines that the voice activity variable j is greater than the value of the voice activity end position jn+Δjn (YES at Operation S165), the error detection unit 33 calculates a speech rate SV as sum2/Δjn (Operation S166). The error detection unit 33 determines whether the voice activity recognized by the speech recognition device 5 is speech or non-speech. That is, the error detection unit 33 determines whether or not the calculated speech rate SV is greater than a certain threshold value Th2 (Operation S167). If the calculated speech rate SV is greater than the certain threshold value Th2 (YES at Operation S167), the error detection unit 33 determines that the voice activity is not the result of erroneous detection, and determines to output the speech-recognized character string ca (Operation S168). The threshold value Th2 may be set to 0.5, for example. If the speech rate SV is determined to be equal to or less than the threshold value Th2 (NO at Operation S167), the error detection unit 33 determines that the voice activity is non-speech and the result of erroneous detection, and determines not to output the character string ca (Operation S169). The error detection unit 33 records the determination result in the recording unit 7 (Operation S170), and the process returns to Operation S108 of FIG. 3.

Returning to FIG. 3, the control unit 9 determines whether or not there is another voice activity recorded in the recording unit 7 (Operation S109). If it is determined that there is another voice activity (YES at Operation S109), the process returns to Operation S107. If it is determined that there is no other voice activity (NO at Operation S109), only the character string ca determined to be output at Operation S168 of FIG. 9 is displayed on the result display device 21 (Operation S110).

For example, if the recognition result recognized by the speech recognition device 5 is a character string ca1 of "weather forecast," "Osaka," "news," and "maximum temperature," and if "news" is detected as an error, the final output result will be a character string ca2 of "weather forecast," "Osaka," and "maximum temperature."

As described above, in the erroneous speech detection determination system 1 according to the first embodiment, two input signals picked up by the microphone array 19 are converted into the frequency domain through FFT in frames each corresponding to a unit time. Further, the phase difference is calculated for each of the frequencies on the basis of the result of conversion of the above-described two input signals, and whether or not a sound has arrived from a certain sound source direction is determined for each of the frequencies. Further, the speech arrival rates SC in all frequency bands in each of the frames are calculated on the basis of the frame length and the number of frequencies determined as corresponding to the sound from the certain sound source direction. The speech rate SV, which represents the proportion of the number of frequencies having a speech arrival rate SC equal to or greater than the threshold value Th1, is calculated by the use of the tendency that the speech arrival rate SC is high in a speech portion. If the speech rate SV is equal to or less than the threshold value Th2, the voice activity detection by the speech recognition device 5 is determined as an error, and the character string ca recognized in the segment is not output. According to the erroneous speech detection determination system 1, the determination accuracy in determining erroneous detection of the voice activity was 90% or higher, even in a noise-mixed sound having an SNR of 0 dB, such as the example illustrated in FIG. 4B, for example.

As described above, with the use of the microphone array 19, the erroneous speech detection determination system 1 according to the first embodiment is capable of determining, in the determination of speech or non-speech in each of the frames, noise having arrived from a direction other than the certain sound source direction as non-speech. Further, the erroneous speech detection determination system 1 is capable of performing the speech recognition by the speech recognition device 5 and the determination of erroneous detection of the voice activity by the erroneous detection determination device 3. Accordingly, the erroneous speech detection determination system 1 is capable of identifying, among the voice activities detected by the speech recognition based on the SNR or the like, the voice activities determined in accordance with the speech rate SV based on the speech arrival rate SC as true voice activities, and is capable of identifying an "out-of-context error" that erroneously detects a noise as a speech.

The erroneous speech detection determination system 1 outputs the speech recognition result of the speech determined as speech on the basis of the speech rate SV, and does not output the speech recognition result of the speech determined as non-speech. It is therefore possible to detect the audio signal of a speaking person without reducing the speech recognition rate, even in a noisy environment with noise difficult to learn previously, such as non-stationary noise generated in a crowd (e.g., speaking voices other than the detection target speech). That is, it is possible to suppress erroneous speech detection and improve the accuracy of speech recognition.

Further, the erroneous speech detection determination system 1 performs in parallel the process of performing the speech recognition and the process of calculating the speech arrival rate SC. The process of calculating the speech arrival rate SC is performed with the use of the input signal per se, and thus is capable of suppressing omission of detection of a true speech due to distortion of the audio signal resulting from, for example, a noise reduction process performed as preprocessing. The speech recognition process is also performed with the use of the input signal per se, and thus is capable of suppressing a reduction in the speech recognition rate due to distortion of the audio signal resulting from, for example, a noise reduction process performed as preprocessing.

Second Embodiment

Subsequently, an erroneous speech detection determination system according to a second embodiment will be described. The operation of the erroneous speech detection determination system according to the second embodiment is a modified example of the speech arrival rate calculation process of the erroneous speech detection determination system 1 according to the first embodiment. Therefore, redundant description of configurations and operations of the erroneous speech detection determination system according to the second embodiment similar to those of the erroneous speech detection determination system 1 according to the first embodiment will be omitted.

Figure 11:
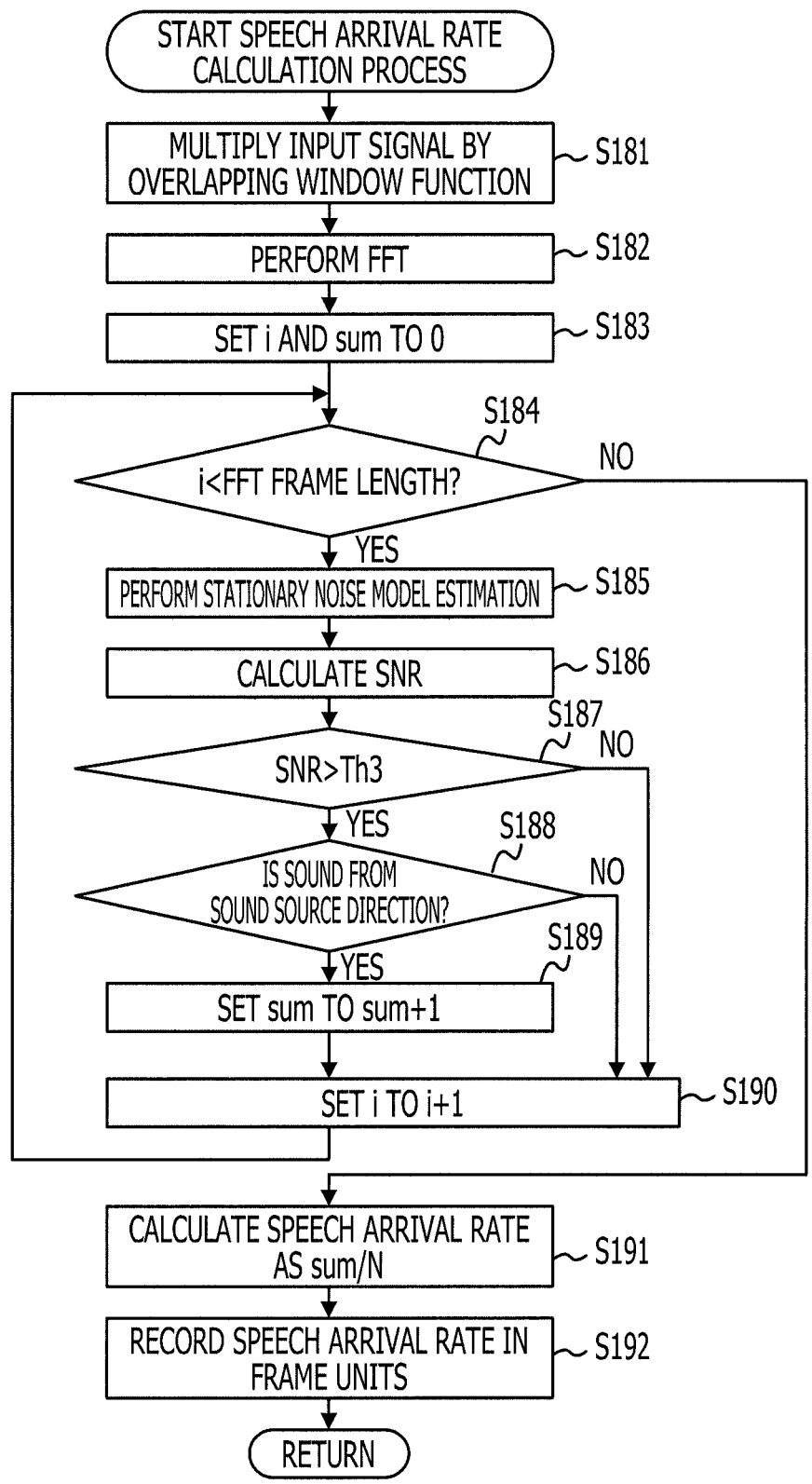
FIG. 11 is a flowchart illustrating a speech arrival rate calculation process according to a second embodiment.

With reference to FIG. 11, the operation of the erroneous speech detection determination system according to the second embodiment will be described below. FIG. 11 is a flowchart illustrating a speech arrival rate calculation process according to the second embodiment. The flowchart of FIG. 11 replaces the flowchart of FIG. 6. Operations S181 to S184 of FIG. 11 are similar to Operations S131 to 134 of FIG. 6, and Operations S188 to S192 of FIG. 11 are similar to Operations S135 to S139 of FIG. 6. Therefore, detailed description thereof will be omitted.

As illustrated in FIG. 11, the FFT process is performed on the two input signals obtained from the microphone array 19, and audio signal sequences of the input signals each including a certain number of samples are converted into the frequency domain. Then, the variable i and the arrival number sum are initialized to 0, and whether or not the relationship: variable i>FFT frame length holds is determined (Operations S181 to S184). These processes are similar to the corresponding processes of FIG. 6.

At Operation S185 of FIG. 11, prior to the calculation of the phase spectrum difference DIFF(f), stationary noise model estimation is performed for each of the frequency bands. For example, whether or not a sound is stationary noise is determined in each of the frequencies with the use of a correlation value or the ratio between the amplitude spectrum of an immediately previously estimated noise model and the amplitude spectrum of the input signal. Then, if the sound is determined as stationary noise, a mean value is calculated. Thereby, the stationary noise model is calculated.

For example, when the representative value of the spectrum in the frame corresponding to the frame number FN is represented as a spectrum |IN(FN, fi)| at the frequency fi corresponding to the current variable i, a stationary noise model |N(FN, fi)| is represented by the following formula (2).

$$|N(FN,fi)|=\alpha(fi)|N(FN-1,fi)|+(1-\alpha(fi))|IN(FN,fi)| \quad (2)$$

Herein, α(fi) is a value ranging from 0 to 1.

The stationary noise model is calculated from, for example, the above formula (2). Further, the SNR is calculated from the amplitude spectrum of the calculated stationary noise model and the amplitude spectrum of the original input signal (Operation S186). If the calculated SNR is greater than a threshold value Th3 (YES at Operation S187), the possibility of the frequency band corresponding to speech is high. Therefore, the phase spectrum difference is calculated, and whether or not the phase spectra correspond to the sound source direction is determined (Operation S188). If the SNR is equal to or less than the threshold value Th3 (NO at Operation S187), the possibility of the frequency band corresponding to speech is low. Therefore, the determination based on the phase spectra is not performed, and the process proceeds to Operation S190. Thereafter, the speech arrival rate SC is calculated in a similar manner as in the first embodiment (Operation S191), and the calculated speech arrival rate SC is recorded (Operation S192). Then, the process returns to the process of FIG. 3.

With the use of the arrival number sum calculated as described above, the speech arrival rate SC is calculated in a similar manner as in the erroneous speech detection determination system 1 of the first embodiment. Herein, the threshold value Th3 may be set to 4, for example.

The erroneous speech detection determination system according to the above-described second embodiment determines that a frequency band having an SNR equal to or less than a certain value does not correspond to the sound from the sound source. The erroneous speech detection determination system according to the second embodiment, therefore, is capable of reducing the processing quantity and time of the calculation unit 31, as well as providing the effect of the erroneous speech detection determination system 1 according to the first embodiment.

Third Embodiment

Figure 12:
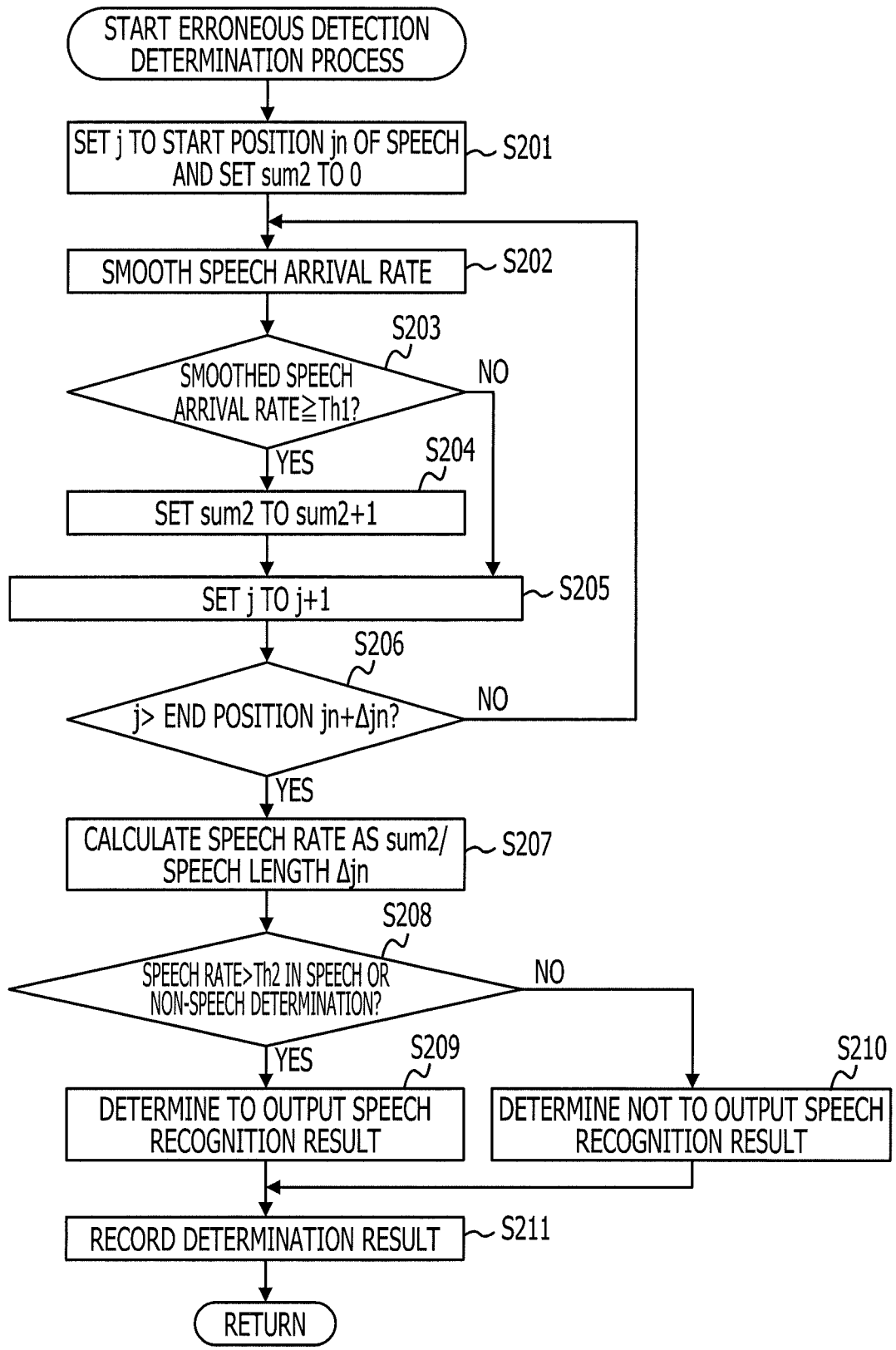
FIG. 12 is a flowchart illustrating an erroneous detection determination process according to a third embodiment.
Figure 13:
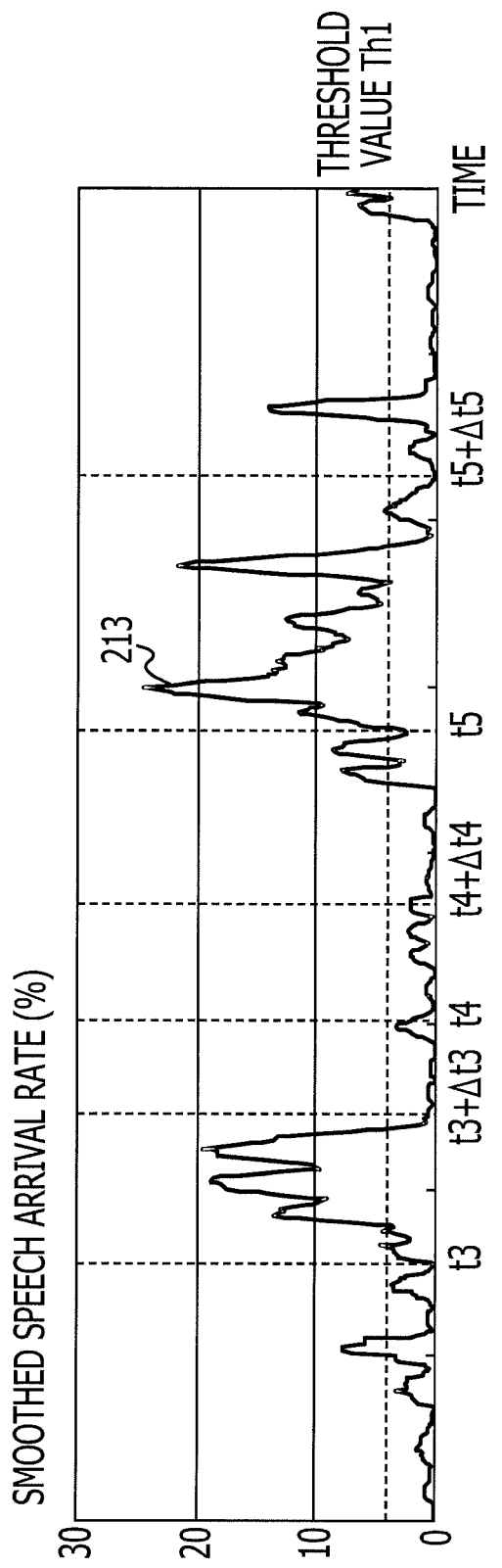
FIG. 13 is a diagram illustrating a smoothed speech arrival rate according to the third embodiment.

With reference to FIGS. 12 and 13, an erroneous speech detection determination system according to a third embodiment will be described below. The operation of the erroneous speech detection determination system according to the third embodiment is a modified example of the erroneous detection determination process of the erroneous speech detection determination system according to the first or second embodiment. Therefore, redundant description of configurations and operations of the erroneous speech detection determination system according to the third embodiment similar to those of the erroneous speech detection determination system according to the first or second embodiment will be omitted.

FIG. 12 is a flowchart illustrating an erroneous detection determination process according to the third embodiment. The flowchart of FIG. 12 replaces the flowchart of FIG. 9. The third embodiment uses a smoothed speech arrival rate resulting from smoothing of the speech arrival rate SC in the time direction. Operation S201 of FIG. 12 is similar to Operation S161 of FIG. 9, and Operations S204 to S211 of FIG. 12 are similar to Operations S163 to S170 of FIG. 9. Therefore, detailed description thereof will be omitted.

As illustrated in FIG. 12, the error detection unit 33 reads the start position jn of the speech from the recognition result information, and initializes the voice activity variable j and the speech rate number sum2 to jn and 0, respectively (Operation S201). The error detection unit 33 then smoothes the speech arrival rate SC (Operation S202). The method of smoothing the speech arrival rate SC in the time direction includes, for example, a method using the mean value of the speech arrival rates SC of ten frames.

FIG. 13 is a diagram illustrating the result of smoothing of the speech arrival rate SC illustrated in FIG. 10. As illustrated in a smoothed speech arrival rate change 213 of FIG. 13, the difference of the voice activity between the times t3 and t3+Δt3 and the voice activity between the times t5 and t5+Δt5 from the other voice activities is more prominent in a smoothed speech arrival rate SCa than in the speech arrival rate SC. In the erroneously detected interval between the times t4 and t4+Δt4, the smoothed speech arrival rate SCa is reduced to lower values.

The error detection unit 33 determines whether or not the smoothed speech arrival rate SCa is equal to or greater than the threshold value Th1, similarly as in the speech arrival rate SC (Operation S203). Then, similarly as in the process of FIG. 9, the error detection unit 33 calculates the speech rate SV, determines whether or not the voice activity is the result of erroneous detection, and records the determination result. Then, the process returns to the process of FIG. 3.

The erroneous speech detection determination system according to the above-described third embodiment performs the smoothing, and thereby is capable of suppressing non-stationary noise that instantaneously increases the speech arrival rate SC to a high value, such as lip noise of a speaking person, and exhibiting an effect of increasing the reliability of the speech arrival rate SC as a basis for determining speech, as well as the effect of the erroneous speech detection determination system 1 according to the first embodiment. Further, the erroneous detection determination process according to the third embodiment may be used in combination with one of the erroneous speech detection determination systems according to the first and second embodiments.

Fourth Embodiment

Figure 14:
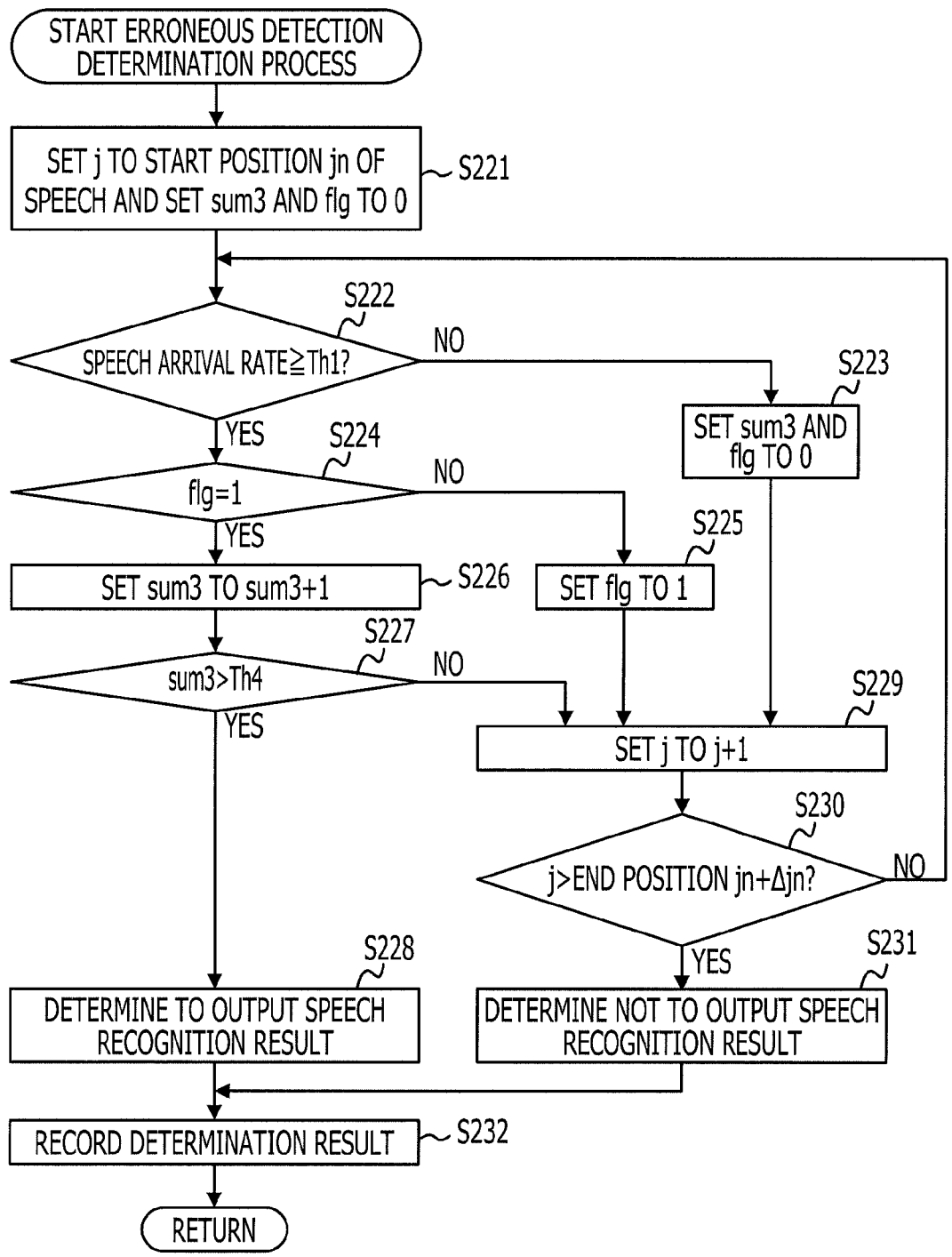
FIG. 14 is a flowchart illustrating an erroneous detection determination process according to a fourth embodiment.

With reference to FIG. 14, an erroneous speech detection determination system according to a fourth embodiment will be described below. The operation of the erroneous speech detection determination system according to the fourth embodiment is a modified example of the erroneous detection determination process of the erroneous speech detection determination systems according to the first to third embodiments. Therefore, redundant description of configurations and operations of the erroneous speech detection determination system according to the fourth embodiment similar to those of the erroneous speech detection determination system according to one of the first to third embodiments will be omitted.

FIG. 14 is a flowchart illustrating an erroneous detection determination process according to the fourth embodiment. The flowchart of FIG. 14 replaces the flowchart of FIG. 9. The fourth embodiment determines an segment as a voice activity, if the number of frames having a speech arrival rate SC equal to or greater than the threshold value Th1 and continuously appearing in the time direction is equal to or greater than a certain threshold value Th4.

As illustrated in FIG. 14, the error detection unit 33 reads the start position jn of the voice activity from the recognition result information, and initializes the voice activity variable j, a continuation number sum3, and a continuation flag flg to jn, 0, and 0, respectively (Operation S221). The continuation number sum3 is a variable for counting the number of frames having a speech arrival rate SC equal to or greater than the threshold value Th1 and continuously appearing in the time direction. The continuation flag flg indicates that the immediately preceding frame has a speech arrival rate SC equal to or greater than the threshold value Th1.

The error detection unit 33 determines whether or not the speech arrival rate SC is equal to or greater than the threshold value Th1 (Operation S222). If the speech arrival rate SC is less than the threshold value Th1 (NO at Operation S222), the error detection unit 33 sets the continuation number sum3 and the continuation flag flg to 0 (Operation S223), and proceeds to Operation S229. If the speech arrival rate SC is equal to or greater than the threshold value Th1 (YES at Operation S222), the error detection unit 33 determines whether or not the continuation flag flg is set to 1 (Operation S224). If the continuation flag flg is not set to 1 (NO at Operation S224), the error detection unit 33 sets the continuation flag flg to 1 (Operation S225), and proceeds to Operation S229.

If the continuation flag flg is set to 1 at Operation S224 (YES at Operation S224), the error detection unit 33 sets the continuation number sum3 to sum3+1 (Operation S226), and determines whether or not the continuation number sum3 is equal to or greater than the threshold value Th4 (Operation S227). The threshold value Th4 is previously determined as the minimum number of continuously appearing frames for determining the determination target segment as a voice activity. The threshold value Th4 is set to, for example, the number of frames corresponding to phonemes in an utterance. Specifically, if the FFT frame length is set to 256 in sampling at 11025 Hz, a constant such as 10 corresponding to phonemes lasting 200 msec is used as the threshold value Th4.

If the continuation number sum3 is less than the threshold value Th4 (NO at Operation S227), the process proceeds to Operation S229. If the continuation number sum3 is equal to or greater than the threshold value Th4 (YES at Operation S227), the error detection unit 33 determines to output the speech recognition result (Operation S228), and proceeds to Operation S232.

The error detection unit 33 sets the voice activity variable j to j+1 at Operation S229, and determines whether or not the voice activity variable j is greater than the value of the voice activity end position jn+Δjn read from the recording unit 7 (Operation S230). If the voice activity variable j is equal to or less than the value of the voice activity end position jn+Δjn (NO at Operation S230), the error detection unit 33 returns to the process of Operation S222. If the voice activity variable j is greater than the value of the voice activity end position jn+Δjn (YES at Operation S230), the error detection unit 33 determines not to output the speech recognition result (Operation S231). At Operation S232, the error detection unit 33 stores in the recording unit 7 the result of determination of whether or not to output the speech recognition result (Operation S232). Then, the process returns to the process of FIG. 3.

The erroneous speech detection determination system according to the above-described fourth embodiment is capable of obtaining the following additional effect, as well as the effect of the erroneous speech detection determination system 1 according to the first embodiment. That is, the segment determined as a voice activity by the speech recognition device 5 is determined as the sound from the sound source, if the number of frames having a speech arrival rate SC equal to or greater than the threshold value Th1 and temporally continuously appearing is equal to or greater than the threshold value Th4. If not, the segment is not determined as the sound from the sound source. Accordingly, the effect of increasing the reliability of the speech arrival rate SC as a basis for determining speech is provided. Further, the erroneous detection determination process according to the fourth embodiment may be used in combination with one of the erroneous speech detection determination systems according to the first to third embodiments.

Fifth Embodiment

Figure 15:
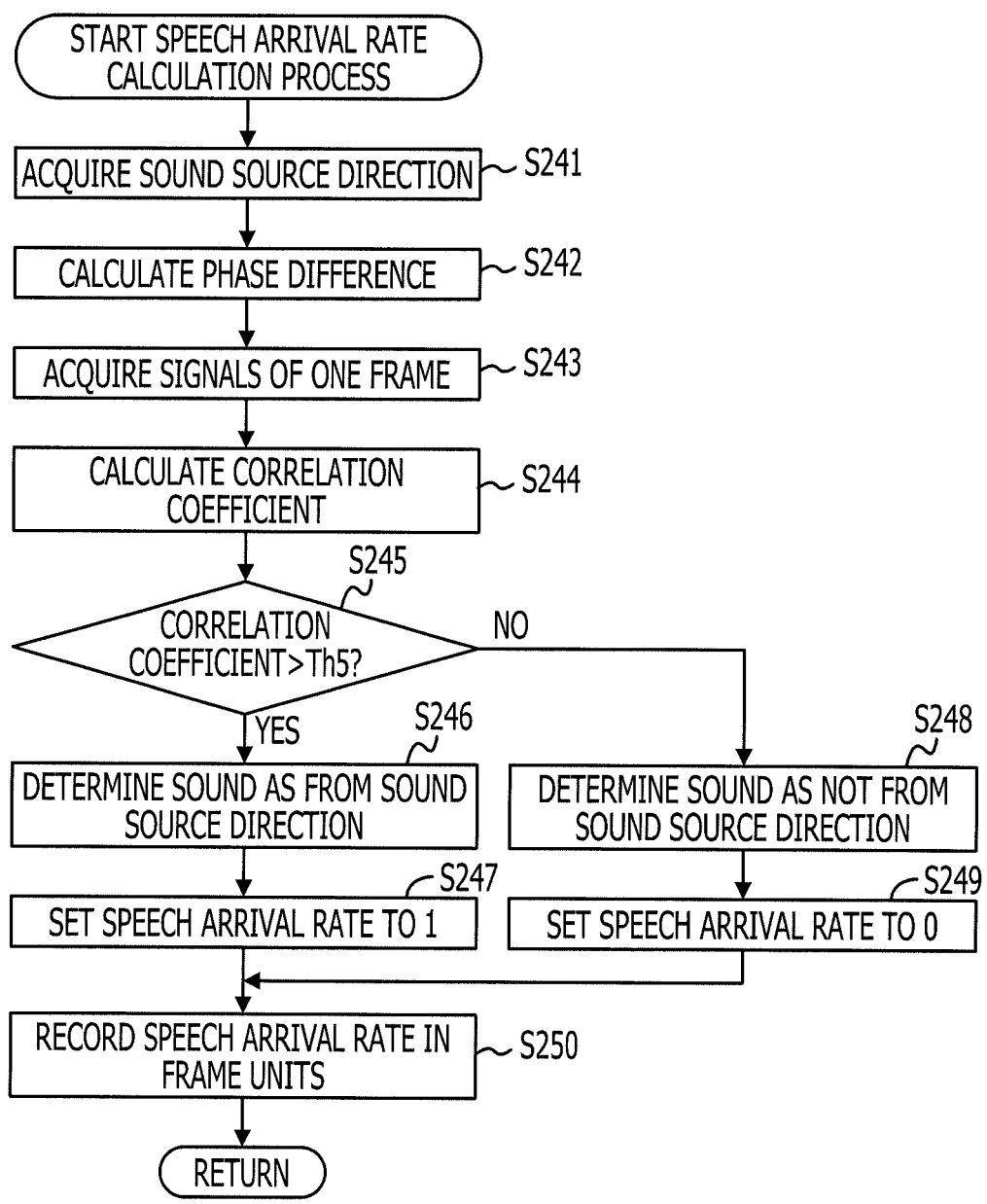
FIG. 15 is a flowchart illustrating a speech arrival rate calculation process according to a fifth embodiment.

With reference to FIG. 15, an erroneous speech detection determination system according to a fifth embodiment will be described below. The operation of the erroneous speech detection determination system according to the fifth embodiment is a modified example of the speech arrival rate calculation process of the erroneous speech detection determination systems according to the first to fourth embodiments. Therefore, redundant description of configurations and operations of the erroneous speech detection determination system according to the fifth embodiment similar to those of the erroneous speech detection determination system according to one of the first to fourth embodiments will be omitted.

FIG. 15 is a flowchart illustrating a speech arrival rate calculation process according to the fifth embodiment. The flowchart of FIG. 15 replaces the flowchart of FIG. 6. The fifth embodiment executes the speech arrival rate calculation without performing FFT. Herein, as described in the first embodiment, the input signals 71A and 71B obtained from the two microphones A and B of the microphone array 19 are recorded in the recording unit 7. Further, the frame number FN is initialized to 0.

As illustrated in FIG. 15, the calculation unit 31 first reads from the recording unit 7 a not-illustrated sound source direction (Operation S241). The sound source direction may previously be input with keys by a user, or may be detected by a sensor. Herein, a coordinate system is defined with a certain point set as the origin, and the sound source direction is set as coordinates in the coordinate system.

Further, the calculation unit 31 detects the phase difference on the basis of the sound source direction and the respective positions of the microphones A and B of the microphone array 19 (Operation S242). Herein, the phase difference is calculated as the difference between the time taken for the sound from the sound source to reach the microphone A and the time taken for the sound from the sound source to reach the microphone B.

The calculation unit 31 reads from the recording unit 7 the input signals 71A and 71B obtained by the microphones A and B, respectively, and extracts the signals INA(t) and INB(t) as the respective signal sequences of the input signals 71A and 71B having, for example, the start time corresponding to the time t0, the frame length N (the number of samples in a frame) corresponding to the certain time, and the frame interval T (Operation S243). In the present embodiment, the frame length N is represented as an integer, such as 128 and 256. The frame length N, however, is not limited to the value $2^n$.

On the basis of the acquired signal sequences and the above-described phase difference, the calculation unit 31 calculates the correlation coefficient of the frame at the acquired position of the sound source (Operation S244). Herein, the correlation coefficient is calculated as a value ranging from −1 to 1. If the calculated correlation coefficient is greater than a certain threshold value Th5 (YES at Operation S245), the calculation unit 31 determines that the sound of the frame is the sound from the sound source direction (Operation S246), and sets the speech arrival rate SC to 1 (Operation S247). If the calculated correlation coefficient is equal to or less than the certain threshold value Th5 (NO at Operation S245), the calculation unit 31 determines that the sound of the frame is not the sound from the sound source direction (Operation S248), and sets the speech arrival rate SC to 0 (Operation S249). Herein, the threshold value Th5 may be set to 0.7, for example. The calculation unit 31 records the calculated speech arrival rate SC and the frame number FN in the recording unit 7 (Operation S250). Then, the process returns to the process of FIG. 3.

The above-described processes of Operations S241 to S250 are repeated for all of the frames. Thereby, the temporal change of the speech arrival rate SC as illustrated in FIG. 10 is obtained. On the basis of the temporal change of the speech arrival rate SC, the erroneous speech detection determination is performed.

The erroneous speech detection determination system according to the above-described fifth embodiment does not use FFT, and thereby exhibits an effect of reducing the calculation time, as well as the effect of the erroneous speech detection determination system 1 according to the first embodiment. Further, the erroneous detection determination process according to the fifth embodiment may be used in combination with one of the erroneous speech detection determination systems according to the first to fourth embodiments.

Sixth Embodiment

Figure 16:
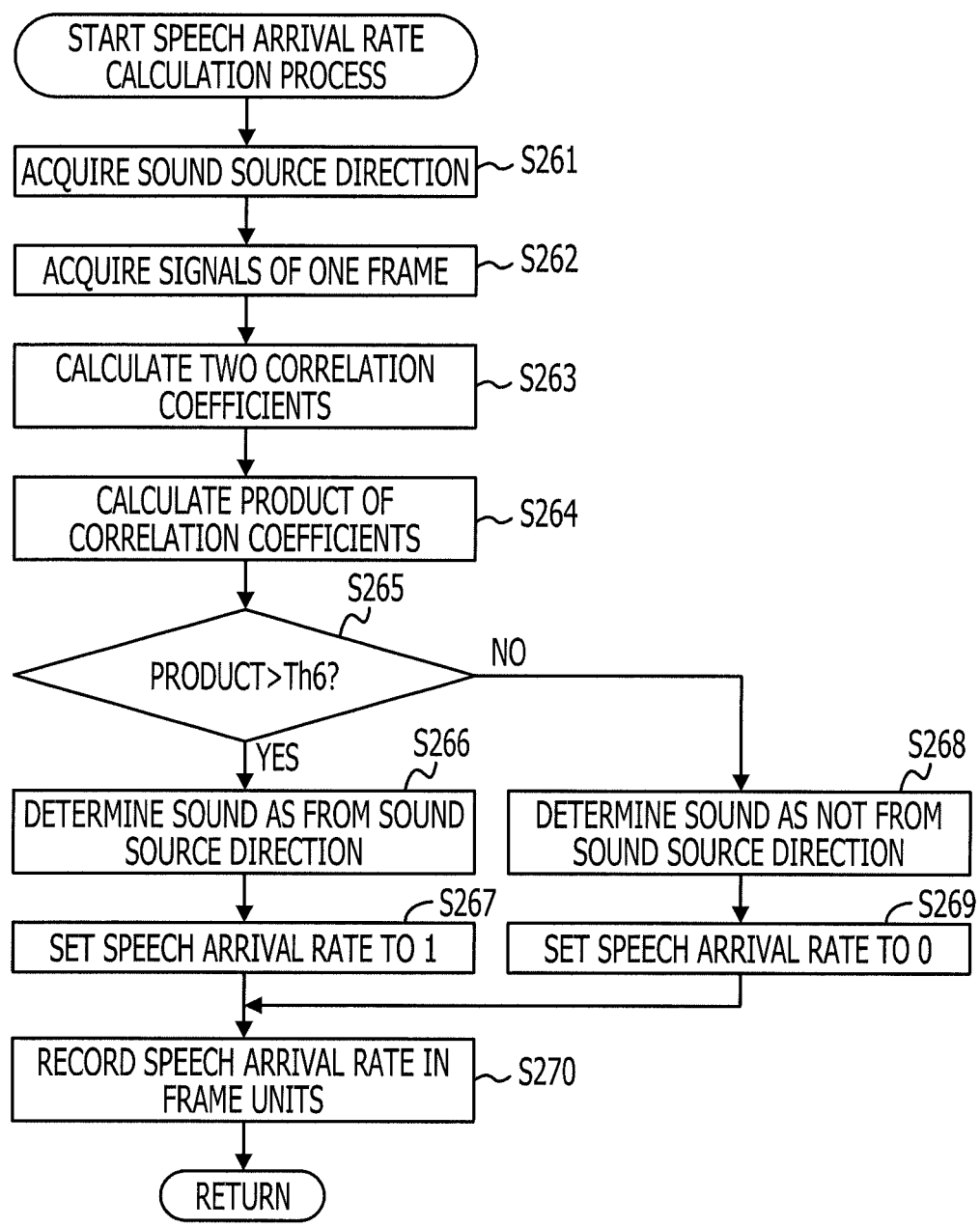
FIG. 16 is a flowchart illustrating a speech arrival rate calculation process according to a sixth embodiment.

With reference to FIG. 16, an erroneous speech detection determination system according to a sixth embodiment will be described below. The operation of the erroneous speech detection determination system according to the sixth embodiment is a modified example of the speech arrival rate calculation process of the erroneous speech detection determination systems according to the first to fifth embodiments. Therefore, redundant description of configurations and operations of the erroneous speech detection determination system according to the sixth embodiment similar to those of the erroneous speech detection determination system according to one of the first to fifth embodiments will be omitted.

The erroneous speech detection determination system according to the sixth embodiment acquires thee audio signals from the microphone array 19. That is, the microphone array 19 is configured to include microphones A, B, and C. Preferably, the microphones A, B, and C are disposed as spaced from one another by a distance not causing a substantial difference between the respective sounds picked up by the microphones A, B, and C and allowing the measurement of the phase difference.

FIG. 16 is a flowchart illustrating a speech arrival rate calculation process according to the sixth embodiment. The flowchart of FIG. 16 replaces the flowchart of FIG. 6. The sixth embodiment executes the speech arrival rate calculation without performing FFT, similarly as in the fifth embodiment. In the sixth embodiment, input signals 71A, 71B, and 71C from the three microphones A, B, and C of the microphone array 19 are recorded in the recording unit 7. Further, the frame number FN is initialized to 0.

As illustrated in FIG. 16, the calculation unit 31 first reads from the recording unit 7 a not-illustrated sound source direction (Operation S261). The sound source direction may previously be input with keys by a user, or may be detected by a sensor. A coordinate system is defined with a certain point set as the origin, and the sound source direction is set as coordinates in the coordinate system.

The calculation unit 31 reads from the recording unit 7 the input signals 71A, 71B, and 71C obtained by the microphones A, B, and C, respectively, and extracts signals INA(t), INB(t), and INC(t) as respective signal sequences of the input signals 71A, 71B, and 71C having, for example, the start time corresponding to the time t0, the frame length N (the number of samples in a frame) corresponding to the certain time, and the frame interval T (Operation S262). In the present embodiment, the frame length N is represented as an integer, such as 128 and 256. The frame length N, however, is not limited to the value $2^n$.

On the basis of the acquired signal sequences, the calculation unit 31 calculates two correlation coefficients of, for example, the input signals 71A and 71B and the input signals 71B and 71C in the frame (Operation S263). The calculation unit 31 calculates the product of the correlation coefficients at the coordinates of the sound source (Operation S264). Herein, each of the correlation coefficients and the product thereof is calculated as a value ranging from −1 to 1. If the calculated product is greater than a certain threshold value Th6 (YES at Operation S265), the calculation unit 31 determines that the sound of the frame is the sound from the sound source direction (Operation S266), and sets the speech arrival rate SC to 1 (Operation S267). If the calculated product of the correlation coefficients is equal to or less than the certain threshold value Th6 (NO at Operation S265), the calculation unit 31 determines that the sound of the frame is not the sound from the sound source direction (Operation S268), and sets the speech arrival rate SC to 0 (Operation S269). Herein, the threshold value Th6 may be set to 0.7, for example. The calculation unit 31 records the calculated speech arrival rate SC and the frame number FN in the recording unit 7 (Operation S270). Then, the process returns to the process of FIG. 3.

The above-described processes of Operations S261 to S270 are repeated for all of the frames. Thereby, the temporal change of the speech arrival rate SC as illustrated in FIG. 10 is obtained. On the basis of the temporal change of the speech arrival rate SC, the erroneous speech detection determination is performed.

The erroneous speech detection determination system according to the above-described sixth embodiment does not use FFT, and thereby exhibits an effect of reducing the calculation time, as well as the effect of the erroneous speech detection determination system 1 according to the first embodiment. Further, the erroneous detection determination process according to the sixth embodiment may be used in combination with one of the erroneous speech detection determination systems according to the first to fourth embodiments.

First Modified Example

An erroneous speech detection determination system according to a first modified example will be described below. The operation of the erroneous speech detection determination system according to the first modified example is a modified example of the recondition result acquisition process (Operation S102 of FIG. 3) and the process of determining speech or non-speech in the erroneous detection determination process (e.g., Operation S167 of FIG. 9) of the erroneous speech detection determination systems according to the first to sixth embodiments. Therefore, redundant description of configurations and operations of the first modified example similar to those of the erroneous speech detection determination system according to one of the first to sixth embodiments will be omitted.

In the first modified example, a "recognition score" representing the reliability of the speech recognition result is acquired, in addition to the start position jn, the voice activity length Δjn, and the character string ca, in the speech recognition of the recognition result acquisition process (Operation S122 of FIG. 5). If the value resulting from multiplication of the speech rate SV by a recognition score SC is greater than the threshold value Th2 at Operation S167 of FIG. 9, the first modified example determines that the determination target segment is a voice activity, and outputs the speech recognition result. That is, a speech rate SV2 is calculated in accordance with a formula: speech rate SV2=recognition score SC×speech rate number sum2/voice activity length Δjn, and is compared with the threshold value Th2.

The recognition score SC is calculated as follows, for example. That is, the recognition unit 52 of the speech recognition device 5 extracts a feature vector sequence from the audio signal in the segment recognized as a voice activity by the voice activity detection unit 51. With the use of the a hidden Markov model (HMM), the recognition unit 52 checks the feature vector sequence against an HMM expressing a recognition target category stored in the language dictionary 55. The recognition unit 52 calculates a natural logarithm value In(P) of an occurrence probability P of the feature vector sequence, and determines the calculation result as the recognition score SC. Preferably, the value of the recognition score SC is normalized to a value ranging from 0 to 1.

For example, if the speech rate SV is 0.5 and the recognition score SC in the range of 0 to 1 is 0.78, the speech rate SV is multiplied by the recognition score SC (0.5×0.78=0.39), and the determination of speech or non-speech is performed on the basis of whether or not the value 0.39 is greater than the threshold value Th2.

As described above, the erroneous speech detection determination system according to the first modified example exhibits an effect of obtaining a result taking both the speech recognition result and the speech arrival rate calculation result into account, as well as the effect of the erroneous speech detection determination system 1 according to the first embodiment. Further, the erroneous detection determination process according to the first modified example may be used in combination with one of the erroneous speech detection determination systems according to the first to sixth embodiments.

Second Modified Example

An erroneous speech detection determination system according to a second modified example will be described below. The operation of the erroneous speech detection determination system according to the second modified example is a modified example of the process of determining speech or non-speech in the erroneous detection determination process (e.g., Operation S167 of FIG. 9) of the erroneous speech detection determination systems according to the first to sixth embodiments. Therefore, redundant description of configurations and operations of the second modified example similar to those of the erroneous speech detection determination system according to one of the first to sixth embodiments will be omitted.

If the value resulting from multiplication of the speech rate SV by the mean SNR of the segment recognized as a voice activity is greater than a threshold value Th7 at Operation S167 of FIG. 9, the second modified example determines that the determination target segment corresponds to the sound from the sound source, and outputs the speech recognition result. That is, a speech rate SV3 is calculated in accordance with a formula: speech rate SV3=SNR×speech rate number sum2/voice activity length Δjn, and is compared with the threshold value Th7. The threshold value Th7 may be set to 4, for example.

As described above, the erroneous speech detection determination system according to the second modified example exhibits an effect of improving the determination accuracy in determining whether or not the determination target segment corresponds to speech, as well as the effect of the erroneous speech detection determination system 1 according to the first embodiment. The effect is particularly exhibited in the first embodiment (the example of FIG. 9) not using the SNR in the speech arrival rate calculation. The erroneous detection determination process of the second modified example may be used in combination with one of the erroneous speech detection determination systems according to the first to sixth embodiments.

Third Modified Example

An erroneous speech detection determination system according to a third modified example will be described below. The operation of the erroneous speech detection determination system according to the third modified example is a modified example of the recognition result acquisition process (Operation S102 of FIG. 3) and the process of determining speech or non-speech in the erroneous detection determination process (e.g., Operation S167 of FIG. 9) of the erroneous speech detection determination systems according to the first to sixth embodiments. Therefore, redundant description of configurations and operations of the third modified example similar to those of the erroneous speech detection determination system according to one of the first to sixth embodiments will be omitted.

In the third modified example, a "recognition score" representing the reliability of the speech recognition result is acquired, in addition to the start position jn, the voice activity length $\Delta jn$, and the character string ca, in the recognition result acquisition process. Further, if the value resulting from multiplication of the speech rate SV by a recognition score SC and the mean SNR of the segment recognized as a voice activity is greater than the threshold value Th2 at Operation S167 of FIG. 9, the third modified example determines that the determination target segment corresponds to the sound from the sound source, and outputs the speech recognition result. That is, a speech rate SV4 is calculated in accordance with a formula: speech rate SV4=recognition score SC×SNR×speech rate number sum2/voice activity length $\Delta jn$, and is compared with the threshold value Th2.

As described above, the erroneous speech detection determination system according to the third modified example exhibits an effect of obtaining a result taking both the speech recognition result and the speech arrival rate calculation result into account, as well as the effect of the erroneous speech detection determination system 1 according to the first embodiment. Further, the determination accuracy in determining whether or not the determination target segment corresponds to speech is improved. The effect is particularly exhibited in the first embodiment (the example of FIG. 9) not using the SNR in the speech arrival rate calculation. The erroneous detection determination process of the third modified example may be used in combination with one of the erroneous speech detection determination systems according to the first to sixth embodiments.

Fourth Modified Example

An erroneous speech detection determination system according to a fourth modified example will be described below. The fourth modified example relates to the method of setting the threshold value Th2 relating to the speech rate SV in the process of determining speech or non-speech in the erroneous detection determination process (e.g., Operation S167 of FIG. 9) of the erroneous speech detection determination systems according to the first to sixth embodiments. Therefore, redundant description of configurations and operations of the fourth modified example similar to those of the erroneous speech detection determination system according to one of the first to sixth embodiments will be omitted, and only methods of setting the threshold value Th2 will be described.

There is a method of continuing to use a constant (e.g., 0.5 as normalized in a range of 0 to 1) as the threshold value Th2. If the SNR is reduced owing to an increase in noise in the "voice activity detection based on the SNR or the like" during the speech recognition process at the speech recognition device 5, however, the actual voice activity is occasionally recognized wider than the voice activity actually is. Further, in the case of a long breath group, devoicing at the end of a word occasionally occurs at the time of utterance. In this case, the speech rate SV tends to be reduced. To address the above-described issues, the method of setting the threshold value Th2 includes, as modified examples thereof, three methods according to the following modified examples 4-1 to 4-3.

Modified Example 4-1 dependent on Voice activity Length $\Delta jn$: Preferably, the threshold value Th2 is set to be reduced in accordance with an increase in the voice activity length $\Delta jn$.

In a modified example 4-1-1, the threshold value Th2 is set to 0.15, when the voice activity length $\Delta jn$ is equal to or greater than 200 frames. In a modified example 4-1-2, the threshold value Th2 is set to 0.80, when the voice activity length $\Delta jn$ is equal to or less than 40 frames. In a modified example 4-1-3, the threshold value Th2 is set to 0.30, when the voice activity length $\Delta jn$ is greater than 40 frames and less than 200 frames. According to the present modified example, even if an segment including only noise is added before and after speech in the voice activities detected by the speech recognition, the erroneous speech detection determination system is capable of maintaining the accuracy of the determination of erroneous voice activity detection.

Modified Example 4-2 dependent on Noise Level: The threshold value Th2 is set to be reduced in accordance with an increase in the noise level. In a modified example 4-2-1, the threshold value Th2 is set to 0.20, when the noise level is equal to or higher than 70 dBA. In a modified example 4-2-2, the threshold value Th2 is set to 0.70, when the noise level is equal to or lower than 40 dBA. In a modified example 4-2-3, the threshold value Th2 is set to 0.30, when the noise level is higher than 40 dBA and lower than 70 dBA. The present modified example is capable of improving the accuracy of erroneous detection determination against fluctuations of the ambient noise environment.

Modified Example 4-3 dependent on Number of Phonemes: The threshold value Th2 is set to be reduced in accordance with an increase in the number of phonemes of the recognition result. In a modified example 4-3-1, the threshold value Th2 is set to 0.25, when the number of phonemes is equal to or larger than 24. In a modified example 4-3-2, the threshold value Th2 is set to 0.60, when the number of phonemes is equal to or smaller than 8. In a modified example 4-3-3, the threshold value Th2 is set to 0.40, when the number of phonemes is larger than 8 and smaller than 24. The present modified example is capable of maintaining the accuracy of erroneous detection determination independently of the number of phonemes. There is also a method of employing a combination of the above-described modified examples 4-1 to 4-3.

Fifth Modified Example

Figure 17:
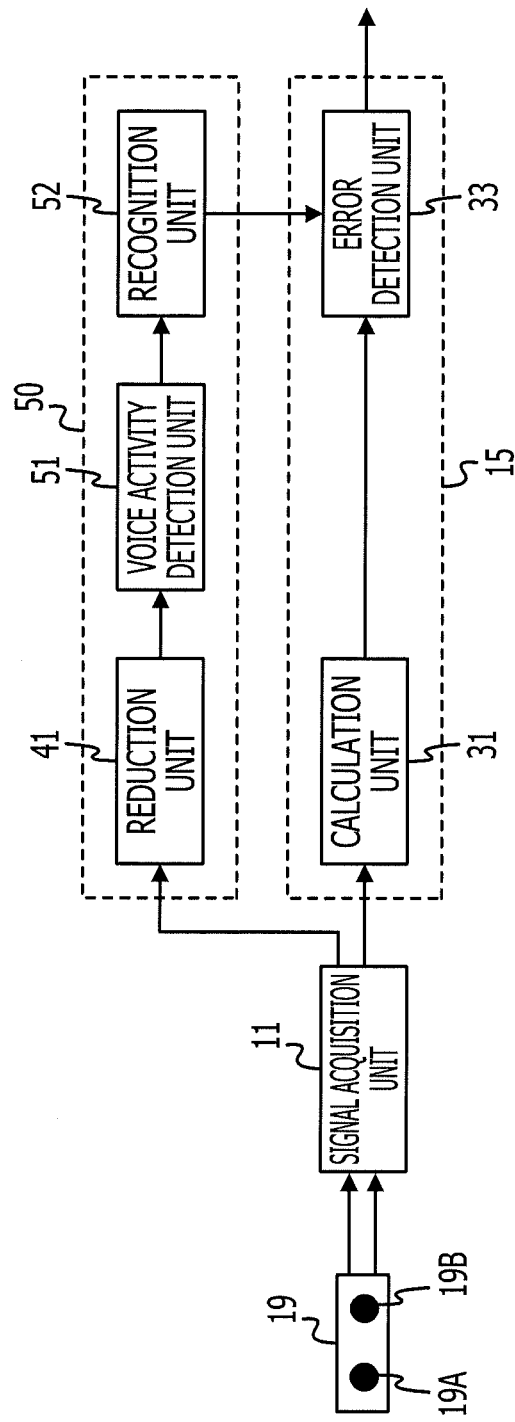
FIG. 17 is a block diagram illustrating functions of an erroneous speech detection determination system according to a fifth modified example.

With reference to FIG. 17, an erroneous speech detection determination system according to a fifth modified example will be described below. The operation of the erroneous speech detection determination system according to the fifth modified example is a modified example of the speech recognition process of the erroneous speech detection determination systems according to the first to sixth embodiments and the modified examples. Therefore, redundant description of configurations and operations of the erroneous speech detection determination system according to the fifth modified example similar to those of the erroneous speech detection determination system according to one of the first to sixth embodiments and the modified examples will be omitted.

FIG. 17 is a block diagram illustrating functions of the erroneous speech detection determination system according to the fifth modified example. The erroneous speech detection determination system illustrated in FIG. 17, which is a modified example of the erroneous speech detection determination system 1 in FIG. 2, includes a speech recognition device 50 in place of the speech recognition device 5. The configuration of the speech recognition device 50 corresponds to the speech recognition device 5 added with a reduction unit 41. The reduction unit 41 reduces the noise of the input signals 71 acquired from the microphone array 19 by the signal acquisition unit 11. A variety of related-art methods may be applied as the method of reducing the noise. For example, the reduction unit 41 may create frames of the input signals 71, convert the input signals 71 into a spectrum in the frequency domain, calculate an envelope on the basis of the spectrum, and removes the envelope from the spectrum, to thereby reduce the noise.

As described above, the erroneous speech detection determination system according to the fifth modified example reduces the noise of the audio signal, and thereby is capable of performing the speech recognition with higher accuracy in a noisy environment, as well as providing the effect of the erroneous speech detection determination system 1 according to the first embodiment. The erroneous detection determination process of the fifth modified example may be used in combination with one of the erroneous speech detection determination systems according to the first to sixth embodiments and the modified examples.

Figure 18:
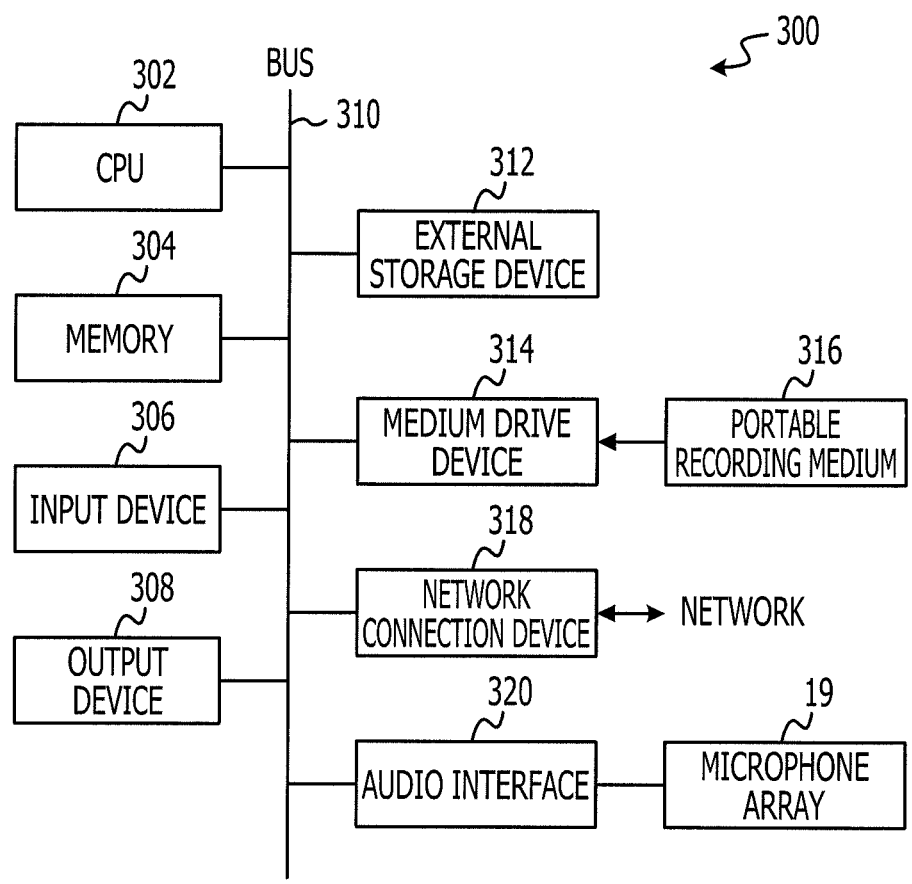
FIG. 18 is a block diagram illustrating an example of a hardware configuration of a computer.

Description will now be made of an example of a computer applied in common to cause the computer to execute the operations of the erroneous speech detection determination systems according to the first to sixth embodiments and the first to fifth modified examples described above. FIG. 18 is a block diagram illustrating an example of a hardware configuration of a standard computer. As illustrated in FIG. 18, in a computer 300, a central processing unit (CPU) 302, a memory 304, an input device 306, an output device 308, an external storage device 312, a medium drive device 314, a network connection device 318, and an audio interface 320, for example, are connected to one another by a bus 310.

The CPU 302 is an arithmetic processing device which controls the overall operation of the computer 300. The memory 304 is a storage unit for previously storing a program for controlling the operation of the computer 300 and for use, when needed, as a work area in the execution of a program. The memory 304 includes, for example, a random access memory (RAM) and a read-only memory (ROM). The input device 306 is a device which acquires, upon operation by a user of the computer 300, inputs of a variety of information from the user associated with the contents of the operation and transmits the acquired input information to the CPU 302. The input device 306 includes a keyboard device and a mouse device, for example. The output device 308 is a device which outputs the result of processing by the computer 300, and includes a display device, for example. The display device displays, for example, text and image in accordance with display data transmitted from the CPU 302.

The external storage device 312, which includes a storage device, such as a hard disk, for example, stores a variety of control programs executed by the CPU 302, acquired data, and so forth. The medium drive device 314 is for writing and reading data to and from a portable recording medium 316. The CPU 302 is also capable of performing a variety of control processes by reading via the medium drive device 314 a certain control program recorded in the portable recording medium 316 and executing the control program. The portable recording medium 316 includes, for example, a compact disc (CD)-ROM, a digital versatile disc (DVD), and a universal serial bus (USB) memory. However, the recording medium does not include a transitory medium such as a propagation signal.

The network connection device 318 is an interface device which controls the transfer of a variety of data to and from an external device by wire or radio. The audio interface 320 is an interface device for acquiring audio signals from the microphone array 19. The bus 310 is a communication path for connecting the above-described devices to one another to allow the exchange of data.

A program for causing the computer 300 to execute the operations of the erroneous speech detection determination systems according to the first to sixth embodiments and the modified examples described above is stored in, for example, the external storage device 312. The CPU 302 reads the program from the external storage device 312, and causes the computer 300 to perform the operation of erroneous speech detection determination. In this case, a control program for causing the CPU 302 to perform the process of erroneous speech detection determination is first created and previously stored in the external storage device 312. Then, a certain instruction is transmitted from the input device 306 to the CPU 302 to cause the CPU 302 to read and execute the control program from the external storage device 312. Further, the program may be stored in the portable recording medium 316.

The present invention is not limited to the above-described embodiments, and various configurations or embodiments may be employed within the scope not departing from the gist of the invention. Further, a plurality of embodiments may be combined within the scope not departing from the gist of the invention. For example, the speech recognition process by the speech recognition device 5 is applicable to any configuration or embodiment which outputs the start position jn of the voice activity, the voice activity length $\Delta jn$ or the voice activity end position $jn+\Delta jn$, and the character string ca of the recognition result. The voice activity length $\Delta jn$ may be replaced by the voice activity end position $jn+\Delta jn$.

The speech arrival rate calculation method is not limited to the methods described above, and may be any method capable of calculating the speech arrival rate SC for each certain time. For example, a mean speech arrival rate SC of the voice activity may be calculated instead of the calculation of the speech rate SV, and may be compared with a certain threshold value. Similarly, the method of estimating the stationary noise model and the method of reducing noise are not limited to the above-described methods, and other methods may be employed.

The microphone array 19 may be provided inside or outside the erroneous speech detection determination system 1. For example, the microphone array 19 may be provided to an information device having a speech recognition function, such as an in-vehicle device, a car navigation device, a hands-free telephone, or a mobile telephone.

The speech recognition device 5 may be provided integrally with the erroneous detection determination device 3, or may be provided outside the erroneous speech detection determination system 1 by the use of a connection device, such as a cable. Further, the speech recognition device 5 may be provided to a device connected to the erroneous speech detection determination system 1 via a network, such as the Internet. If the speech recognition device 5 is provided outside the erroneous speech detection determination system 1, the input signals acquired by the microphone array 19 are transmitted by the erroneous speech detection determination system 1, and the speech recognition device 5 performs processing on the basis of the received input signals.

The direction of the sound source may previously be stored in the recording unit 7 in accordance with an input with keys or the like, or may be automatically detected by an additionally provided digital camera, ultrasonic sensor, or infrared sensor. Further, the acceptable range used in the calculation of the speech arrival rate SC may be determined in accordance with the direction of the sound source on the basis of a program executable by the control unit 9.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An erroneous detection determination device comprising:
   a signal acquisition unit configured to acquire, from each of a plurality of microphones, a plurality of audio signals relating to ambient sound including sound from a sound source in a certain direction;
   a result acquisition unit configured to acquire a recognition result including voice activity information indicating a voice activity relating to at least one of the plurality of audio signals;
   a calculation unit configured to calculate, on the basis of the signal of respective unit time of the plurality of audio signals and the certain direction, a speech arrival rate representing the proportion of the sound from the certain direction to the ambient sound in each of the unit times; and
   an error detection unit configured to determine, on the basis of the recognition result and the speech arrival rate, whether or not the voice activity information is the result of erroneous detection.

2. The erroneous detection determination device according to claim 1,
   wherein the error detection unit calculates a speech rate representing the proportion of the unit times having the speech arrival rate equal to or greater than a first threshold value in the voice activity, and determines, on the basis of the speech rate and a second threshold value, whether or not the voice activity information is the result of erroneous detection.

3. The erroneous detection determination device according to claim 1,
   wherein the calculation unit generates two audio signals on the frequency axis through conversion of the signals in the respective unit times extracted from two of the plurality of audio signals, calculates a phase difference in each frequency between the two audio signals on the frequency axis, sets an acceptable range of the phase difference in the each frequency on the basis of the certain direction, and calculates the speech arrival rate on the basis of the phase difference and the acceptable range.

4. The erroneous detection determination device according to claim 3,
   wherein the calculation unit estimates a stationary noise model of the audio signals, and calculates the speech arrival rate, if a signal-to-noise ratio resulting from the application of the stationary noise model to the two audio signals on the frequency axis is greater than a threshold value.

5. The erroneous detection determination device according to claim 1,
   wherein the error detection unit calculates a smoothed speech arrival rate corresponding to the mean of the speech arrival rates of the respective unit times, and determines, on the basis of the recognition result and the smoothed speech arrival rate, whether or not the voice activity information is the result of erroneous detection.

6. The erroneous detection determination device according to claim 1,
   wherein the error detection unit determines that the voice activity information is not the result of erroneous detection, if the unit times having the speech arrival rate equal to or greater than a threshold value continuously appear for a certain time or longer.

7. The erroneous detection determination device according to claim 2,
   wherein the result acquisition unit acquires a recognition score representing the reliability of the recognition result, and
   wherein the error detection unit calculates, as a new speech rate, a value resulting from multiplication of the speech rate by the recognition score, and determines that the voice activity information is the result of erroneous detection, if the new speech rate is equal to or less than the second threshold value.

8. The erroneous detection determination device according to claim 2,
   wherein the error detection unit calculates, as a new speech rate, a value resulting from multiplication of the speech rate by a mean signal-to-noise ratio of the voice activity, and determines that the voice activity information is the result of erroneous detection, if the new speech rate is equal to or less than the second threshold value.

9. The erroneous detection determination device according to claim 2,
   wherein the second threshold value is set to be reduced in accordance with an increase in the voice activity.

10. The erroneous detection determination device according to claim 2,
    wherein the second threshold value is set to be reduced in accordance with an increase in the noise level of the voice activity.

11. The erroneous detection determination device according to claim 2,
    wherein the recognition result further includes an uttered character string recognized by speech recognition, and
    wherein the second threshold value is set to be reduced in accordance with an increase in the number of phonemes in the character string.

12. The erroneous detection determination device according to claim 1,
    wherein the calculation unit calculates a correlation function of two of the plurality of audio signals and a phase difference between the two audio signals relative to the certain direction, and calculates the speech arrival rate on the basis of the correlation function and the phase difference.

13. An erroneous detection determination device comprising:
    a processor configured to execute
    acquiring, from each of a plurality of microphones, a plurality of audio signals relating to ambient sound including sound from a sound source in a certain direction,
    acquiring a recognition result including voice activity information indicating the inclusion of a voice activity relating to at least one of the plurality of audio signals,
    calculating, on the basis of the signal of respective unit time of the plurality of audio signals and the certain direction, a speech arrival rate representing the proportion of the sound from the certain direction to the ambient sound in each of the unit times, determining, on the basis of the recognition result and the speech arrival rate, whether or not the voice activity information is the result of erroneous detection, and outputting the result of determination.

14. The erroneous detection determination device according to claim 13, wherein the calculating includes calculating a speech rate representing the proportion of the unit times having the speech arrival rate equal to or greater than a first threshold value to the voice activity, and wherein the determining includes determining, on the basis of the speech rate and a second threshold value, whether or not the voice activity information is the result of erroneous detection.

15. The erroneous detection determination device according to claim 13, wherein the calculating includes generating two audio signals on the frequency axis through conversion of the signals in the respective unit times extracted from two of the plurality of audio signals, calculating a phase difference in each frequency between the two audio signals on the frequency axis, setting an acceptable range of the phase difference in the each frequency on the basis of the certain direction, and calculating the speech arrival rate on the basis of the phase difference and the acceptable range.

16. The erroneous detection determination device according to claim 15, wherein the calculating includes estimating a stationary noise model of the audio signals, and calculating the speech arrival rate, if a signal-to-noise ratio resulting from the application of the stationary noise model to the two audio signals on the frequency axis is greater than a threshold value.

17. The erroneous detection determination device according to claim 13, wherein the determining includes calculating a smoothed speech arrival rate corresponding to the mean of the speech arrival rates of the respective unit times, and determining, on the basis of the recognition result and the smoothed speech arrival rate, whether or not the voice activity information is the result of erroneous detection.

18. The erroneous detection determination device according to claim 13, further comprising:

another processor configured to execute detecting the voice activity on the basis of one of the plurality of audio signals, performing speech recognition on the basis of the audio signal in an segment detected as the voice activity, to thereby generate the recognition result, and outputting the recognition result to the other processor.

19. A storage medium storing an erroneous detection determination program that causes a computer to execute:

acquiring, from each of a plurality of microphones, a plurality of audio signals relating to ambient sound including sound from a sound source in a certain direction;

acquiring a recognition result including voice activity information indicating the inclusion of a voice activity relating to at least one of the plurality of audio signals;

calculating, on the basis of the signal of respective unit time of the plurality of audio signals and the certain direction, a speech arrival rate representing the proportion of the sound from the certain direction to the ambient sound in each of the unit times;

determining, on the basis of the recognition result and the speech arrival rate, whether or not the voice activity information is the result of erroneous detection; and outputting the result of determination.

20. An erroneous detection determination method executed by a computer, the erroneous detection determination method comprising:

acquiring, from each of a plurality of microphones, a plurality of audio signals relating to ambient sound including sound from a sound source in a certain direction;

acquiring a recognition result including voice activity information indicating the inclusion of a voice activity relating to at least one of the plurality of audio signals;

calculating, on the basis of the signal of respective unit time of the plurality of audio signals and the certain direction, a speech arrival rate representing the proportion of the sound from the certain direction to the ambient sound in each of the unit times;

determining, on the basis of the recognition result and the speech arrival rate, whether or not the voice activity information is the result of erroneous detection; and outputting the result of determination.

* * * * *